US010135651B2

(12) United States Patent
Hedayat

(10) Patent No.: US 10,135,651 B2
(45) Date of Patent: Nov. 20, 2018

(54) ENHANCED CLEAR CHANNEL ASSESSMENT

(71) Applicant: NEWRACOM, INC., Irvine, CA (US)

(72) Inventor: Ahmad Reza Hedayat, Aliso Viejo, CA (US)

(73) Assignee: NEWRACOM, INC., Lake Forest, CA (US)

( * ) Notice: Subject to any disclaimer, the term of this patent is extended or adjusted under 35 U.S.C. 154(b) by 167 days.

(21) Appl. No.: 15/192,959

(22) Filed: Jun. 24, 2016

(65) Prior Publication Data

US 2016/0381688 A1 Dec. 29, 2016

Related U.S. Application Data

(60) Provisional application No. 62/279,756, filed on Jan. 16, 2016, provisional application No. 62/252,727, (Continued)

(51) Int. Cl.
*H04W 4/00* (2018.01)
*H04B 7/005* (2006.01)
(Continued)

(52) U.S. Cl.
CPC .......... *H04L 27/26* (2013.01); *H04L 27/0006* (2013.01); *H04W 16/14* (2013.01); (Continued)

(58) Field of Classification Search
CPC . H04L 27/26; H04L 27/0006; H04L 27/2602; H04W 16/14; H04W 74/0816; H04W 88/08
See application file for complete search history.

(56) References Cited

U.S. PATENT DOCUMENTS

2014/0286203 A1* 9/2014 Jindal ................... H04J 11/0026
370/278
2015/0264578 A1* 9/2015 Chaves ............. H04W 74/0808
370/338
(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Kiet Tang
(74) *Attorney, Agent, or Firm* — Morgan, Lewis & Bockius LLP

(57) ABSTRACT

In an example of multi-user wireless communications, an access point may send a downlink frame to a first station. The first station may generate and transmit an uplink frame. A second station in a same or different basic service set coverage area as that of the access point performs a clear channel assessment of a medium associated with the station for transmitting a frame without interrupting a frame exchange between the access point and the first station. The second station receives the downlink frame and the uplink frame of the frame exchange. The second station determines a signal measurement of the uplink frame, and determines a status of the medium based on the signal measurement and the downlink frame. The first station may update or ignore a network allocation vector timer based on the status of the medium. Other methods, apparatus, and computer-readable media are also disclosed.

19 Claims, 15 Drawing Sheets

Related U.S. Application Data filed on Nov. 9, 2015, provisional application No. 62/184,190, filed on Jun. 24, 2015.

(51) Int. Cl.

| | | |
|---|---|---|
| *H04L 12/50* | (2006.01) | |
| *H04W 72/00* | (2009.01) | |
| *H04L 27/26* | (2006.01) | |
| *H04W 16/14* | (2009.01) | |
| *H04W 74/08* | (2009.01) | |
| *H04L 27/00* | (2006.01) | |
| *H04W 88/08* | (2009.01) | |

(52) U.S. Cl.
CPC ..... *H04W 74/0816* (2013.01); *H04L 27/2602* (2013.01); *H04W 88/08* (2013.01)

(56) References Cited

U.S. PATENT DOCUMENTS

2016/0174079 A1* 6/2016 Wang ................... H04W 52/50
455/454

2017/0295560 A1* 10/2017 Kim ..................... H04W 72/02

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

ENHANCED CLEAR CHANNEL ASSESSMENT

CROSS-REFERENCE TO RELATED APPLICATIONS

This application claims the benefit of priority from U.S. Provisional Application No. 62/184,190, entitled "ENHANCED CCA METHODS," filed Jun. 24, 2015, U.S. Provisional Application No. 62/252,727, entitled "ENHANCED CCA METHODS," filed Nov. 9, 2015, and U.S. Provisional Application No. 62/279,756, entitled "ENHANCED CCA METHODS," filed Jan. 16, 2016, the entirety of each of which is incorporated herein by reference.

TECHNICAL FIELD

The present description relates in general to wireless communication systems and methods, and more particularly to, for example, without limitation, enhanced clear channel assessment (CCA).

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption the battery-operated devices.

The description provided in the background section may not be assumed to be prior art merely because it is mentioned in or associated with the background section. The background section may include information that describes one or more aspects of the subject technology.

Figure 1:
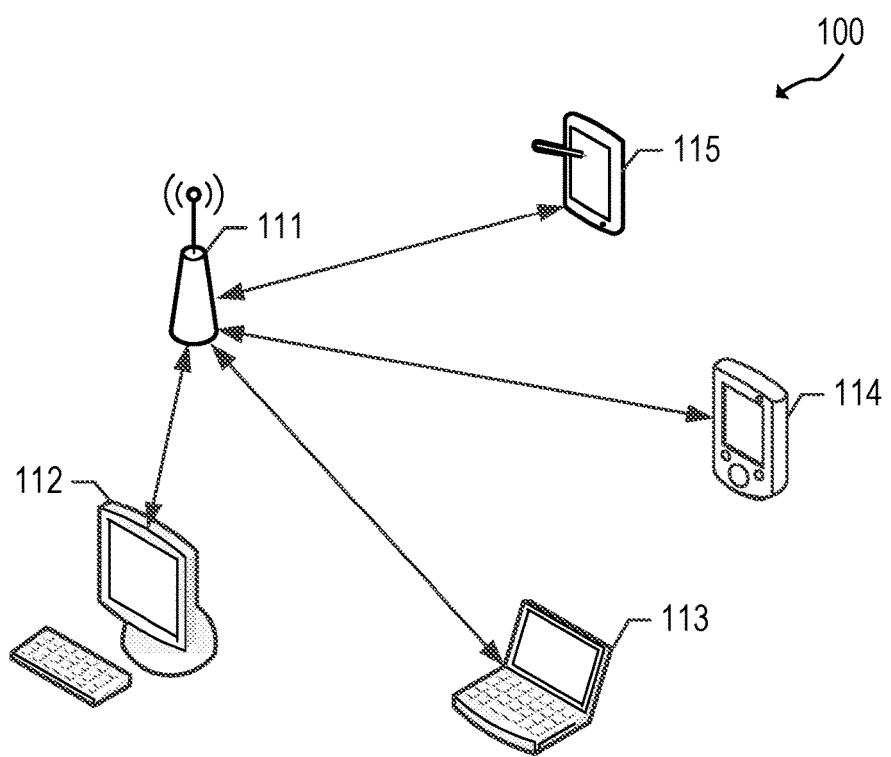
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

New multi-user (MU) transmissions, such as downlink (DL) orthogonal frequency division multiple access (OFDMA) and DL MU multiple-input/multiple-output (MIMO), provide new opportunities for next-generation WiFi technology. For example, OFDMA is a technique that can be used in WiFi technology in order to enhance the aggregation of multiple payloads that are destined to multiple stations (STAs) within the same frame. Due to this and other advantages, OFDMA technique is being considered for next generation WLAN technologies, including 802.11ax which is also referred to as high efficiency (HE) technology.

With OFDMA technique, there comes new opportunities and challenges that may be considered in the design of OFDMA signaling and procedures. Among the opportunities that are provided by OFDMA is the frequency selectivity gain, where AP would allocate resources to each STA where those allocated resources offer highest frequency-gain for that STA. Using acknowledgement procedures, the access point (AP) can obtain the information that is needed to harvest frequency selectivity gain for each STA in the subsequent DL or uplink (UL) OFDMA frames.

While clear channel assessment (CCA) is fixed in the current IEEE 802.11 standard, it would be advantageous to adapt CCA, then each basic service set (BSS) or even for each STA, to an optimum level that depends on the locations of the STA relative to the AP, and relative to the neighboring BSS STAs and/or overlapping BSS (OBSS) STAs. Despite the benefits of adaptive CCA, in one aspect, the adapting STA would need to consider potential nearby STAs whose frames may receive significant interference. An immediate consequence of a less sensitive CCA rule is the introduction of additional hidden nodes. These unintended consequences indicate the need for solutions that avoid additional interference problems (such as collision, higher interference, etc.) that result from aggressive CCA techniques, which affect the newly introduced hidden nodes.

The enhanced CCA methods can allow 802.11-based STAs to decide when it is safe and fair to adapt to a less sensitive CCA. Particularly, in the current 802.11 standard (e.g., 802.11ac), the legacy CCA rule is applied based on the information obtained from a single frame. One or more implementations of the present disclosure, however, apply CCA based on a pair of frames, namely each frame and its potential response from the actual recipient of the frame. In this respect, considering a pair of frames (e.g., an initial frame and a response frame) enables the observing STA to more precisely evaluate the level of interference it may cause to the pair of STAs (that have exchanged the initial frame and the response frame). The enhanced CCA (or new CCA) rules can be applied to each of a frame/response frame exchange, such as (i) a request to send/clear to send (RTS/CTS) exchange, (ii) a data frame and acknowledgment/block acknowledgment (ACK/BA) exchange, or (iii) a trigger frame and data/control frame exchange.

The enhanced CCA rules, which may be sometimes referred to as Differential CCA (DCCA) rules, are based on received signal strength indicator (RSSI) levels from two consecutive frames; e.g., a frame and a response to the frame, may be utilized to assess the status of the medium. One or more aspects of the DCCA rules relax the existing legacy CCA rule and allow for more spatial reuse. In doing so, the DCCA rules can ensure that the level of interference, which can affect the primary pair of STAs, is relatively low. Some indicators may be present in a physical (PRY) header (e.g., HE SIG-A and SIG-B) of the frames to facilitate the process of DCCA.

One or more implementations of the enhanced CCA techniques may specify: (i) CCA rules based on a pair of frames, e.g., a frame and a response frame; (ii) rules for transmission opportunity (TXOP) and network allocation vector (NAV) reservation mechanisms; (iii) CCA rules based on RTS and CTS frames; (iv) CCA rules based on data and ACK/BA frames; and/or (v) CCA rules based on a trigger frame and responsive data/control frames. In one or more aspects, the enhanced CCA techniques or a portion(s) thereof may be sometimes referred to as new CCA rules, modified CCA rules, Differential CCA (DCCA) rules, Double CCA (DCCA) rules, response frame CCA rules, CCA threshold rules, or one or more of such rules. Rules may be sometimes referred to as methods, procedures, or techniques.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a medium access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NW), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, the an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
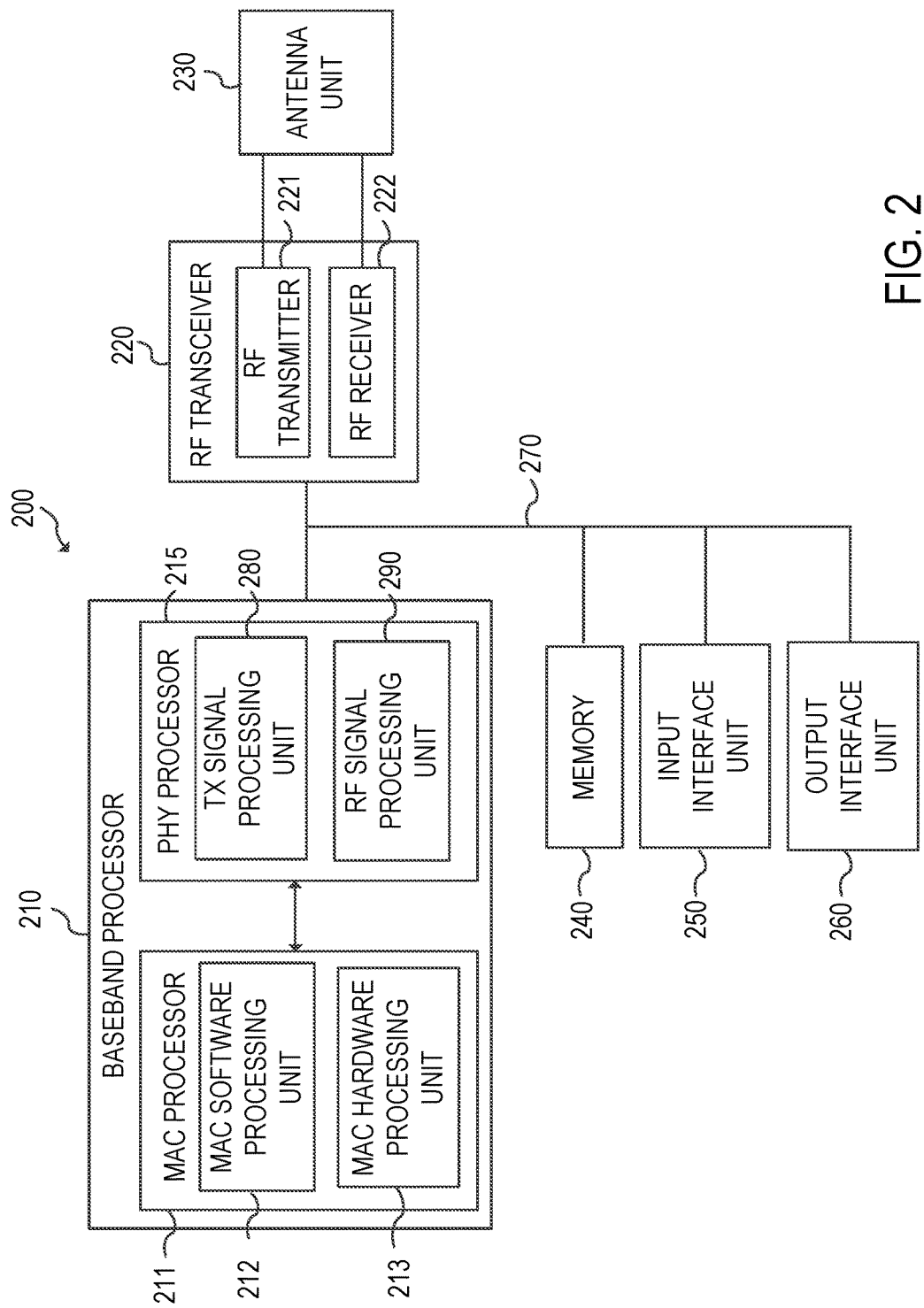
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term IN may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be anon-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or anon-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art: would recognize how to implement the instructions.

A processor (e.g., 210, 211, 212, 2.13, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
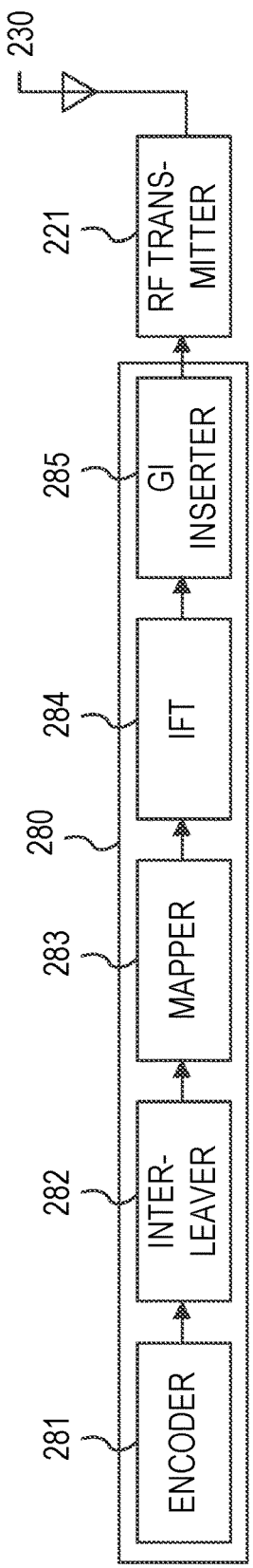
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamfoming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (LEFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GE to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
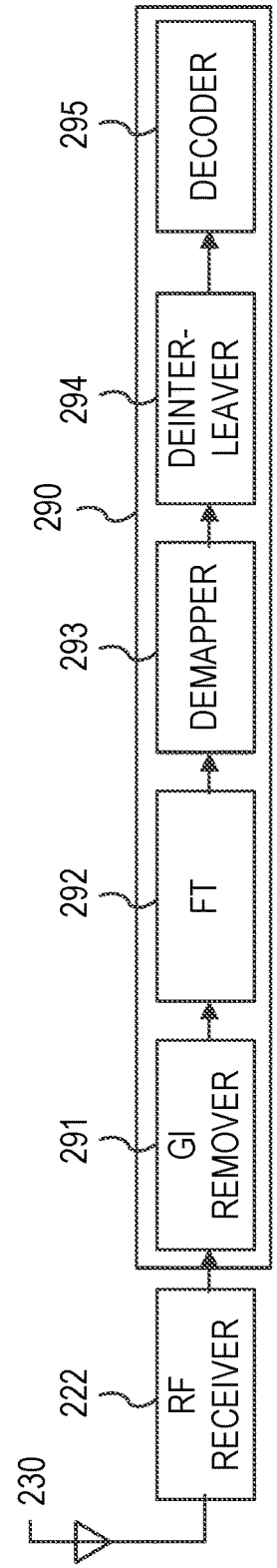
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding, is used.

When AMMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
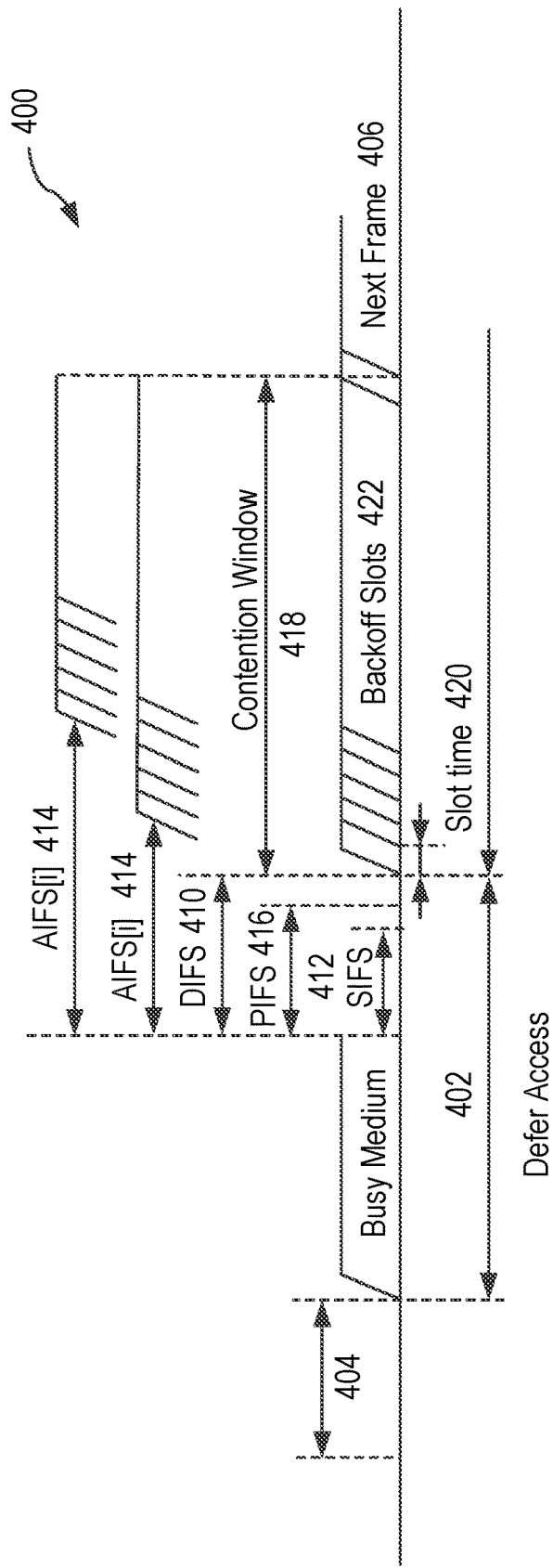
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIRS) 412 has elapsed. The type and subtype of frame may be identified by a type field and a subtype field a frame control field of the frame.

On the other hand, a Quality of Service (QoS) STA may transmit the frame after performing backoff if AIFS 414 for access category (AC), e.g. AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
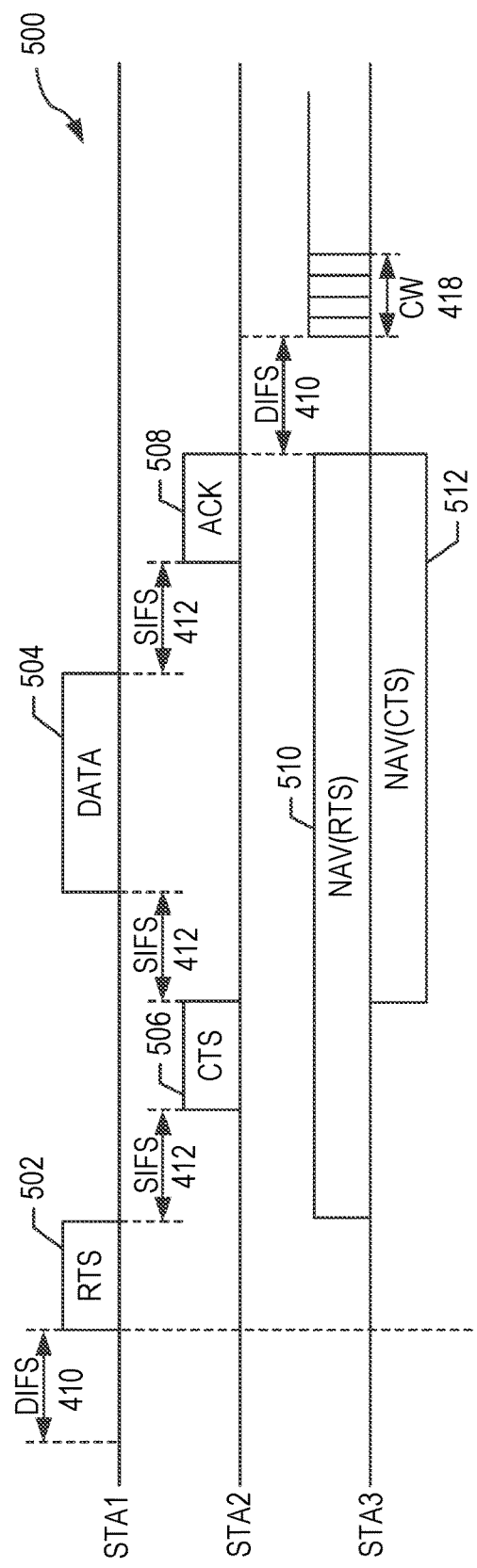
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1. Is a transmit WLAN device for transmitting data. STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIFS 410 (e.g., the channel is idle), the STAT may transmit an RTS frame 502 to the STA2 after performing backoff Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received, Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Figure 6A:
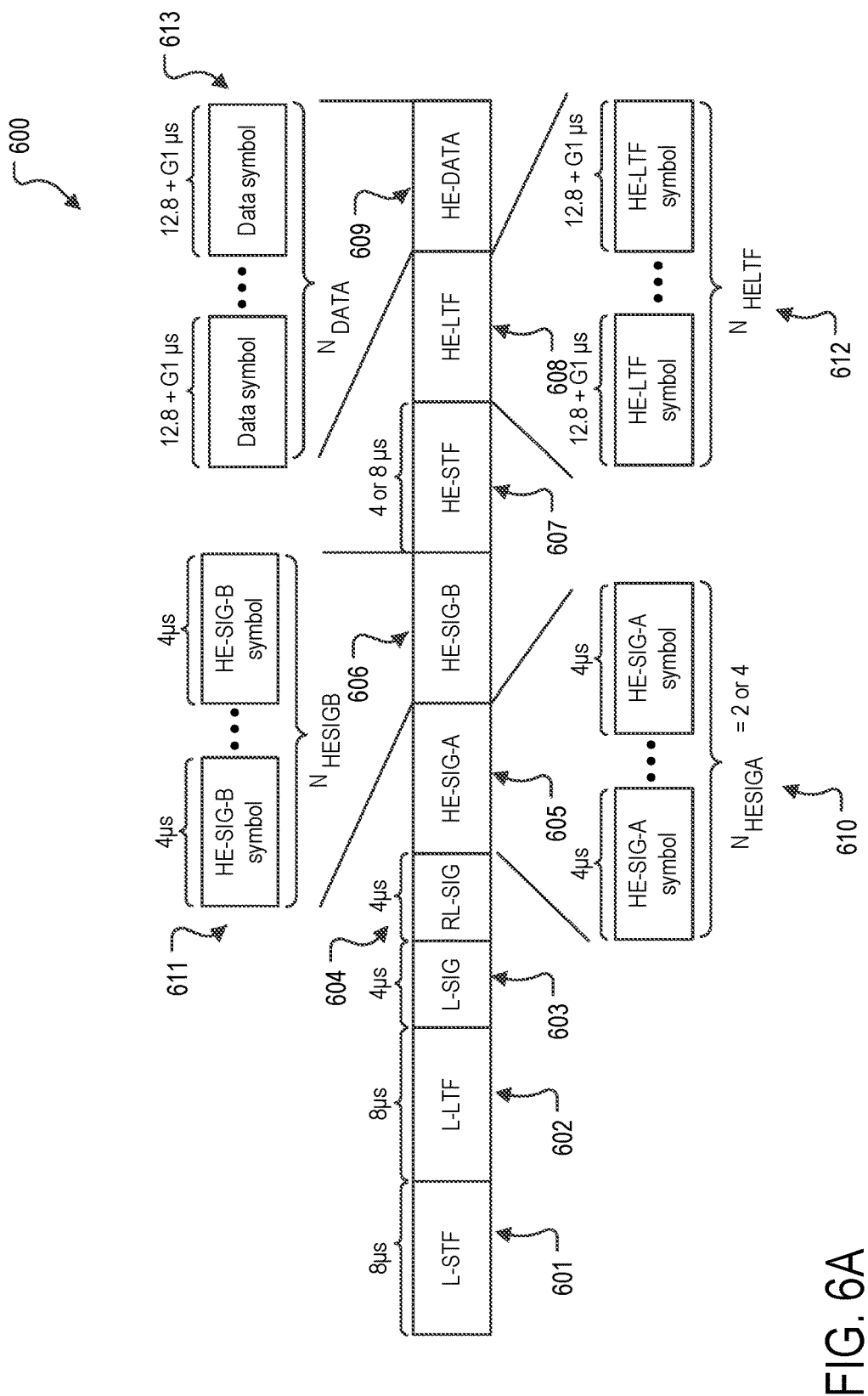
FIG. 6A, illustrates a schematic diagram of an example of a format of a high efficiency (HE) physical layer convergence procedure (MCP) protocol data unit (HE PPDU) frame.

FIG. 6A illustrates a schematic diagram of an example of a format of a high efficiency (HE) physical layer convergence procedure (PLCP) protocol data unit (HE PPDU) frame 600. A transmitting STA generates the PPDU frame 600 and transmits the PPDU frame 600 to a receiving STA. The receiving STA receives, detects, and processes the PPDU frame 600. The PPDU frame 600 includes an L-STF field 601, an L-LTF field 602, an L-SIG field 603, an RL-SIG field 604, an HE-SIG-A field 605, an HE-SIG-B field 606, an HE-STF field 607, an HE-LTF field 608, and an HE-DATA field 609. The HE-SIG-A field 605 includes $N_{HESIGA}$ symbols 610, the HE-SIG-B field 606 includes $N_{HESIGB}$ symbols 611, the field 608 includes $N_{HELTF}$ symbols 612, and the HE-DATA field 609 includes $N_{DATA}$ symbols 613. Table 1, shown below, describes fields of the PPDU frame 600 in more detail.

TABLE 1

| | | PPDU Frame | | | | |
|---|---|---|---|---|---|---|
| Element | Definition | Duration | DFT period | GI | Subcarrier Spacing | Description |
| Legacy(L)-STF | Non-high throughput(HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |

TABLE 1-continued

| | | | PPDU Frame | | | |
|---|---|---|---|---|---|---|
| Element | Definition | Duration | DFT period | GI | Subcarrier Spacing | Description |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |
| HE-LTF | HE Long Training field | $N_{HELTF}$ * (DFT period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU may support 2xLTF mode and 4xLTF mode. In the 2xLTF mode, HE-LTF symbol excluding GI is equivalent to modulating every other |

TABLE 1-continued

| Element | Definition | Duration | DFT period | GI | Subcarrier Spacing | Description |
|---|---|---|---|---|---|---|
| HE-DATA | HE DATA field | $N_{DATA}$ * (DFT period + GI) μs | 12.8 μs | supports 0.8, 1.6, 3.2 μs | 78.125 kHz | tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. $N_{DATA}$ means the number of HE data symbols. |

An HE frame may be referred to as an OFDMA frame, a PPDU, a PPDU format, an OFDMA PPDU, an MU PPDU, another similar term, or vice versa. An HE frame may be simply referred to as a frame for convenience. In one or more implementations, an AP may transmit a frame for downlink (DL) using a frame format shown in this figure or a variation thereof (e.g., without any or some portions of an HE header). A STA may transmit a frame for uplink using a frame format shown in this figure or a variation thereof (e.g., without any or some portions of an HE header).

Referring to FIG. 6A, the HE frame 600 contains a header and a data field. The header includes a legacy header comprised of a legacy short training field (L-STF), a legacy long training field (L-LTF), and a legacy signal (L-SIG) field. These legacy fields contain symbols based on an early design of an IEEE 802.11 specification. The L-STF, L-LTF, and L-SIG fields may be 8 μs, 8 μs, and 4 μs, respectively. Presence of these symbols would make any new design compatible with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz (e.g., 40 MHz, 80 MHz, 160 MHz). Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. Thus, in one aspect, the L-STF field is not affected by the channel dispersion. The L-LTF field may be utilized for channel estimation, fine frequency-offset correction, and symbol timing. The L-SIG field includes one orthogonal frequency division multiplexing (OFDM) symbol. Thus, in one aspect, the term L-SIG field may be used interchangeably with L-SIG symbol. In one or more aspects, the L-SIG field may contain information indicative of a data rate and a length (e.g., in bytes) associated with the HE frame 600, which may be utilized by a receiver of the HE frame 600 to calculate a time duration of a transmission of the HE frame 600.

The header may also include an HE header comprised of an HE-SIG-A field and on HE-SIG-B field. The HE-SIG-A field may sometimes be referred to simply as a SIG-A field. These fields contain symbols that early control information that may be vital regarding each PLCP service data unit (PSDU) and regarding the radio frequency (RF), PHY, and MAC properties of a PPDU. Several sub-fields may be located either in the HE-SIG-A and/or HE-SIG-B fields. In one aspect, the HE-SIG-A field can be carried/modulated using an FFT size of 64 on a 20 MHz basis. The HE-SIG-B field can be carried/modulated using an FFT size of e.g., 64 or 256 on a 20 MHz basis depending on implementation. The HE-SIG-A and HE-SIG-B fields may occupy the entire channel bandwidth of the frame. In some aspects, the size of the HE-SIG-A field and/or the HE-SIG-B field is variable. In other words, the number of symbols contained in the HE-SIG-A field and/or HE-SIG-B field can vary from frame to frame. An HE-SIG-B field is not always present in all frames. In some cases, single user (SU) packets and UL trigger-based packets do not contain the HE-SIG-B field. To facilitate decoding of the HE: frame 600 by a receiver, the size of (e.g., number of symbols contained in) the HE-SIG-B field may be indicated in the HE-SIG-A field. In some aspects, the HE header also includes a repeated L-SIG (RE-SIG) field, whose content is the same as the L-SIG For a 20 MHz channel, an FFT size of 64 is associated with a discrete Fourier transform (DFT) period of 3.2 μs and a subcarrier spacing of 312.5 kHz. For a 20 MHz channel, an FFT size of 256 is associated with a DFT period of 12.8 μs and a subcarrier spacing of 78.125 kHz. The DFT period may also be referred to as an inverse DFT period (IDFT) or an IDFT/DFT period. The DFT period may be denoted as $T_{DFT}$. The subcarrier spacing may be referred to as a subcarrier frequency spacing and may be denoted as $\Delta_F$. The subcarrier spacing may be obtained by dividing the channel bandwidth by the HT size. The subcarrier spacing is the reciprocal of the DFT period.

The HE header may further include HE-STF and HE-ETF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. In one aspect, an HE-LTF sequence may be utilized by a receiver to estimate MIMO channel between the transmitter and the receiver. Channel estimation may be utilized to decode data transmitted and compensate for channel properties (e.g., effects, distortions). For example, when a preamble is transmitted through a wireless channel, various distortions may occur, and a training sequence in the HE-LTF field is useful to reverse the distortion. This may be referred to as equalization. To accomplish this, the amount of channel distortion is measured. This may be referred to as channel estimation. In one aspect, channel estimation is performed using an HE-LTF sequence, and the channel estimation may be applied to other fields that follow the HE-LTF sequence.

The HE-STF symbols may have a fixed pattern and a fixed duration. For example, the HE-STF symbols may have a predetermined repeating pattern. In one aspect, the HE-STF symbols do not require FFT processing. The HE frame 600 may include the data field, represented as HE-DATA, that contains data symbols. The data field may also be referred to as a payload field, data, payload, PSDU, or Media Access Control (MAC) Protocol Data Units (MPDU) (e.g., MAC frame).

In one or more aspects, additional one or more HE-LTF fields may be included in the header. For example, an additional HE-LTF field may be located after a first HE-LTF field. The HE-LTF fields may be, for example, modulated/carried with FFT size of 64 on a 20 MHz channel and may be included as part of the first part of the HE frame 600. In one or more implementations, a TX signal processing unit 280 (or an IFT 284) illustrated in FIG. 3A may carry out the modulation described in this paragraph as veil as the modulations described in other paragraphs above. In one or more implementations, an RX signal processing unit 290 (or an FT 292) may perform demodulation for a receiver.

Figure 6B:
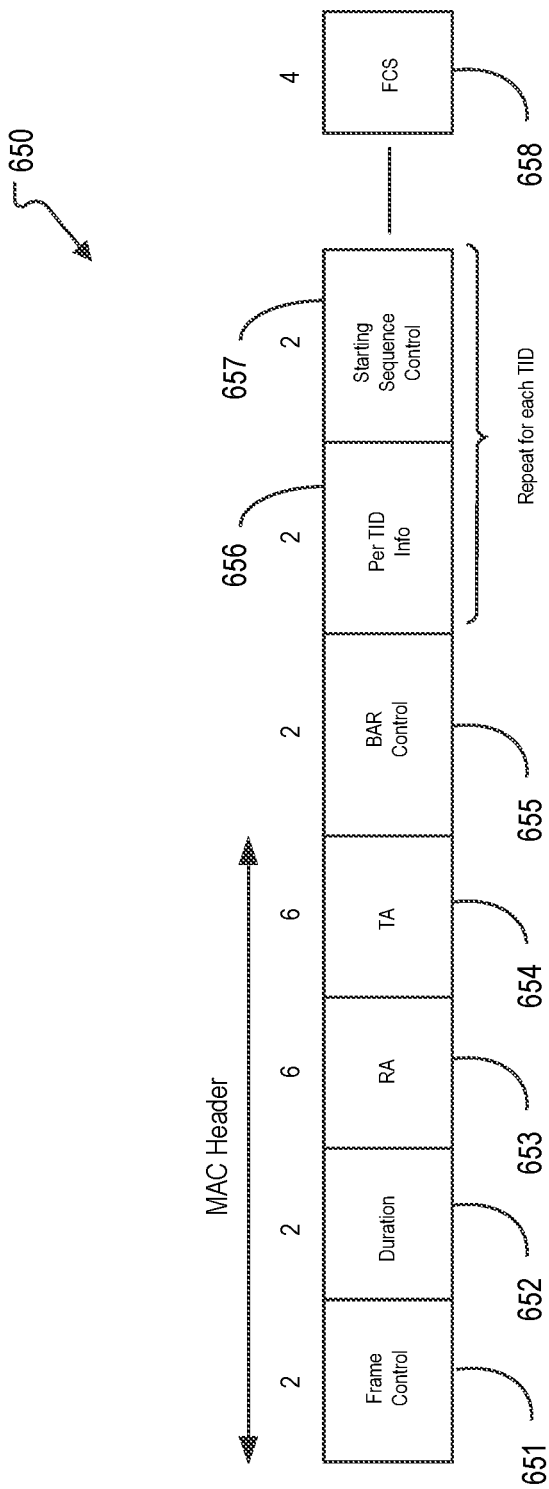
FIG. 6B illustrates a schematic diagram of an example of a block acknowledgment request (BAR) frame and its components.

FIG. 6B illustrates a schematic diagram of an example of a block acknowledgment request (BAR) frame and its components. In one aspect, a MAC processor 211 generates this MAC layer frame shown in this figure. In one aspect, the frame in FIG. 6B is a frame format for downlink. The frame 650 includes a frame control field 651, a duration field 652, a receiver address or receiving station address (RA) field 653, a transmitting station address (TA) field 654, a BAR control field 655, a per TID information field 656, a starting sequence control field 657, and a frame check sequence (FCS) field 658. In some aspects, the per TID information field 656 and the starting sequence control field 657 are repeated for each TID.

Figure 7:
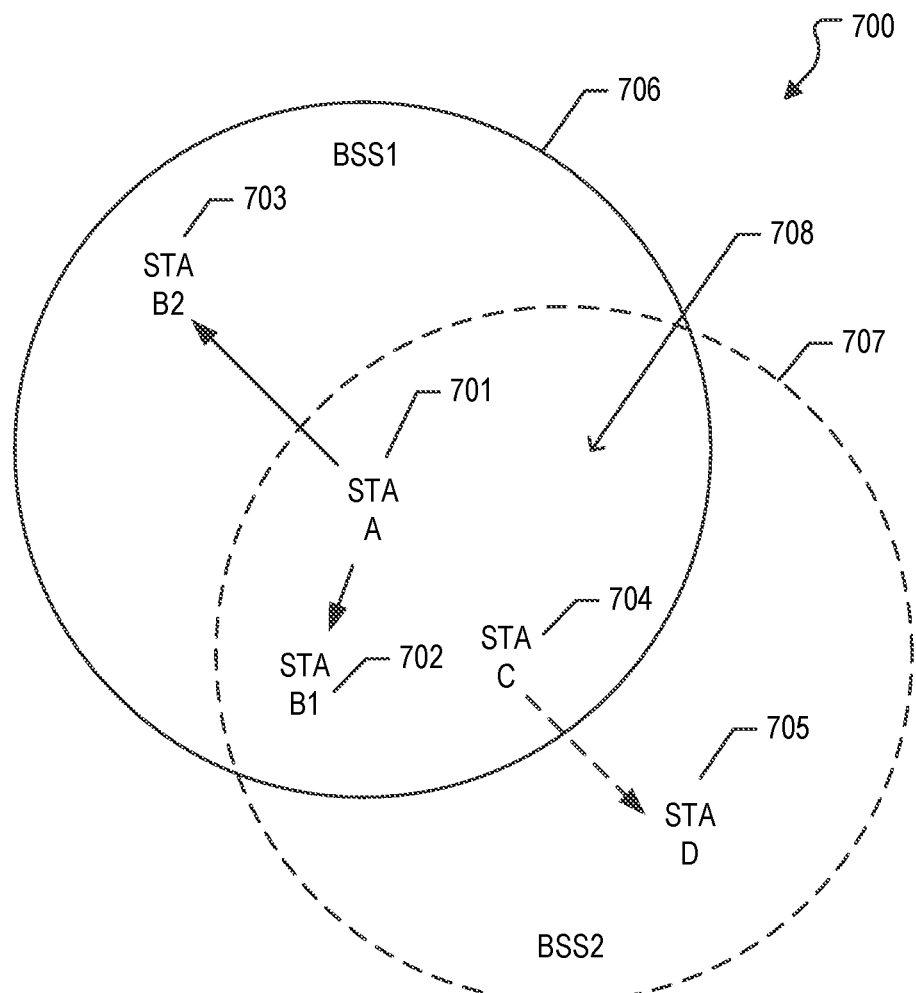
FIG. 7 illustrates a schematic diagram of an example of partially overlapping basic service sets involving a legacy clear channel assessment (CCA) rule.

FIG. 7 illustrates a schematic diagram 700 of an example, of partially overlapping basic service sets involving a legacy CCA rule. The schematic diagram 700 includes a first basic service set (BSS1) 706 and a second basic service set (BSS2) 707. The BSS1 706 includes a first station 701 (e.g., AP or STA A), a second station 702 (e.g., STA B1), and a third station 703 (e.g., STA B2). The BSS2 707 includes a fourth station 704 (e.g. STA C) and a fifth station 705 (e.g., STA D). In this regard, the first station 701, the second station 702 and the fourth station 704 are within the boundaries of both basic service sets. The first station 701 is transmitting downlink frames to the second station 702 and to the third station 703, while the fourth station 704 is attempting to transmit a downlink frame to the fifth station 705.

The legacy CCA rule compares the signal strength indicator (RSSI) of a received frame (e.g., downlink frame received by STA B1) to a threshold to set the medium status (e.g., BUSY or IDLE). When a frame is received/detected by a STA (e.g., 702, 703, 705), and after comparing the RSSI of the received frame with thresholds given in the IEEE 802.11 specification, the receiving STA concludes whether the medium is BUSY or IDLE. Note that when a STA detects no 802.11 frame but some energy, the STA compares the RSSI of the energy with some thresholds, and concludes whether the medium is BUSY or IDLE.

In FIG. 7, the right protection is provided for the downlink frame whose recipient, e.g., STA B1, is in a cross-coverage area 708. However, unnecessary protection is provided for the downlink frames whose recipient, e.g., STA B2, is outside the cross-coverage area 708. The legacy CCA rule limits the level of interference made to the transmitter of the frame (e.g., STA A).

In some aspects, the IEEE 802.11 specification provides that an indication of the BSS from which the transmitting STA belongs to (i.e., associated with the AP that has established the BSS) may be located in the PHY header of a frame. Such indication may be referred to as a Color field, and it is a low-bit representation of the BSS identifier (BSSID). In some aspects, a STA may use aggressive CCA thresholds toward frames that do not carry the same Color field value as that of the STA.

It would be desirable to incorporate the level of interference made to the recipient of the frame to the legacy CCA rule. With a single frame exchange, it is difficult to obtain any information about the interference made to the recipient of the frame. However, considering a frame and its response frame, e.g., RTS and CTS, it is possible to measure the RSSI of both frames and infer the potential interference made to the recipient of a frame. In this respect, a procedure where the NAV value (e.g., 510 of FIG. 5) may be revised depending on conditions at the recipient of an ongoing BSS/OBSS frame, which are discussed in more detail below.

Figure 8A:
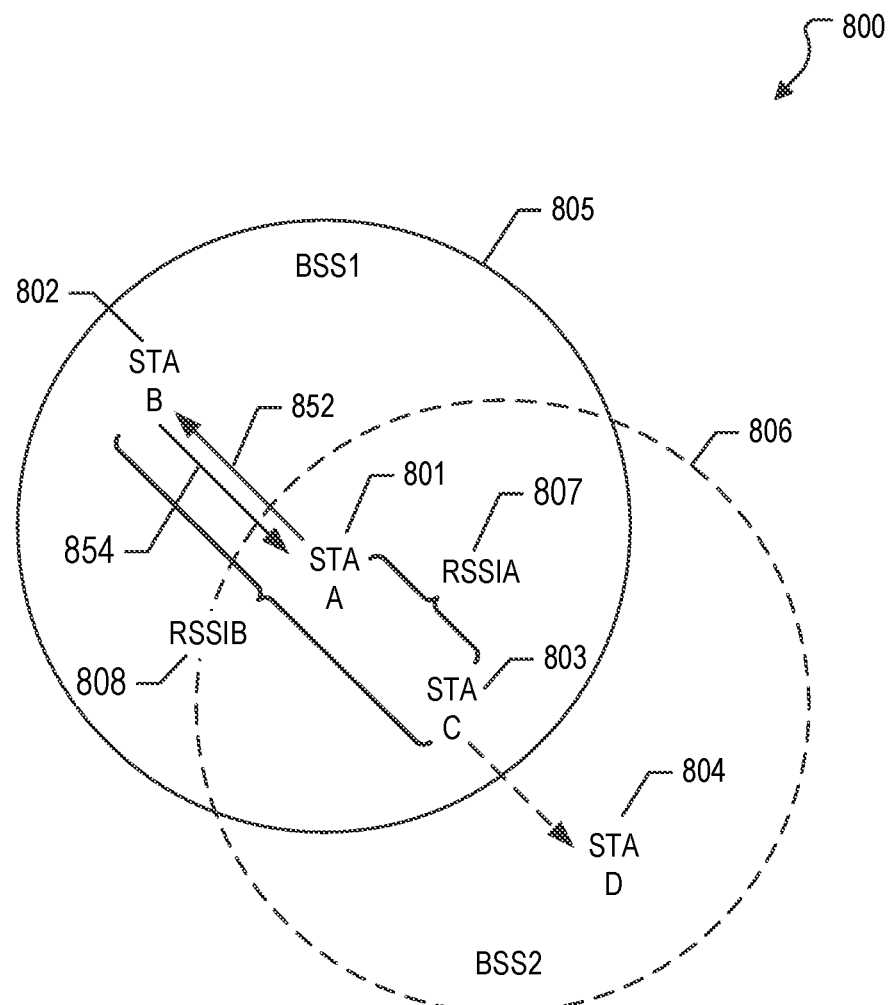
FIG. 8A illustrates a schematic diagram of an example of partially overlapping basic service sets involving a response frame CCA rule.
Figure 8B:
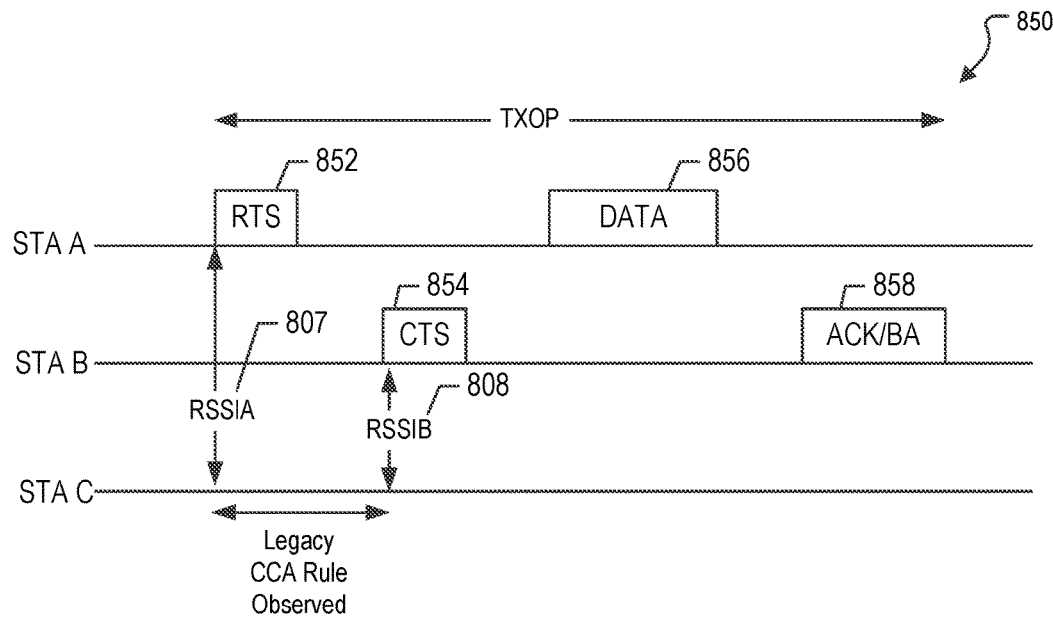
FIGS. 8B and 8C illustrate examples of timing diagrams of transmission procedures involving the legacy CCA rule and the response frame CCA rule.
Figure 8C:
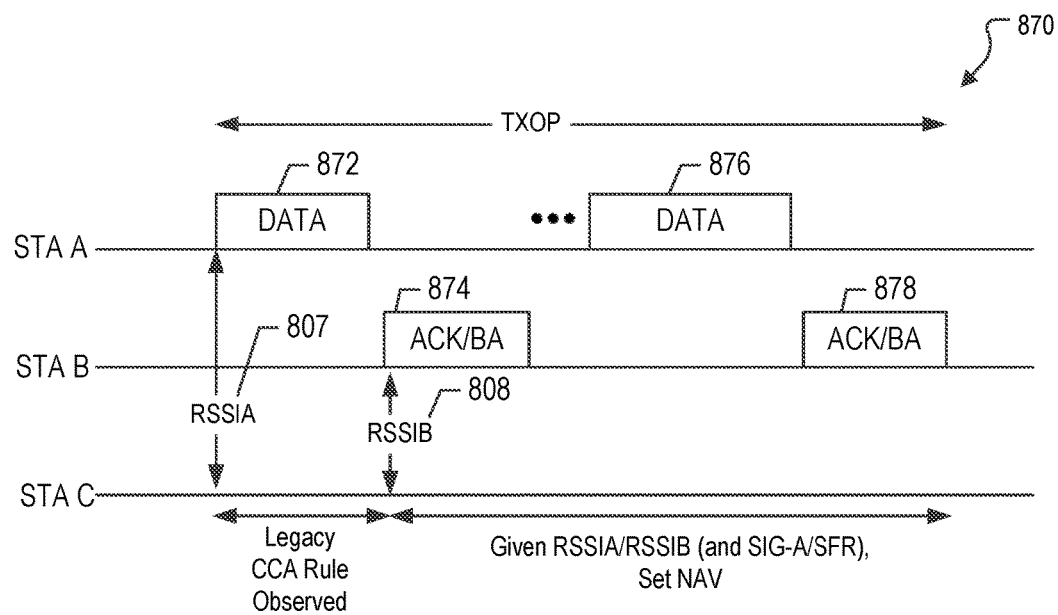

FIG. 8A illustrates a schematic diagram 800 of an example of partially overlapping basic service sets involving a response frame CCA rule. FIGS. 8B and 8C illustrate examples of timing diagrams (e.g., 850, 870) of transmission procedures involving the legacy CCA rule and the response frame CCA rule. The schematic diagram 800 includes a first basic service set (BSS1) 805 and a second basic service set (BSS2) 806. The BSS1 805 includes a first station 801 (e.g., STA A), and a second station 802 (e.g., STA B). The BSS2 806 includes the third station 803 and a fourth station 804 (e.g., STA D). In this regard, the first station 801 and the third station 803 are within the boundaries of both basic service sets. The first station 801 is transmitting a downlink frame (e.g., RTS 852) to the second station 802, and the second station 802 sends a response frame (e.g., CTS 854) to the first station 801.

The third station 803 (e.g., STA C) attempts to assess the condition of the medium and to decide whether the medium is IDLE or BUSY. For a response frame CCA rule, which may be referred to as a DCCA rule, STA C evaluates the status of the medium based on the following rules.

Step (1) STA C receives a first frame (the downlink frame sent from the first station 801 (e.g., STA A) to the second station 802 (e.g., STA B)) and measures the associated RSSI of the first frame to be RSSIA (e.g., 807). STA C evaluates and concludes the status of the medium as the first status (e.g., IDLE or BUSY). To obtain the first status of the medium, STA C uses the RSSI thresholds set by the IEEE 802.11 specification. The process of obtaining the first status is described in detail below. Table 2 provides an example of bandwidth-based thresholds.

of the first frame, STA C may set RSSIB (e.g., 808) to a predetermined threshold indicating very low signal strength.

TABLE 2

Bandwidth-Based Thresholds

| Operating Channel Width | Conditions |
|---|---|
| 20 MHz, 40 MHz, 80 MHz, 160 MHz or 80 + 80 MHz | The start of a 20 MHz NON_HT PPDU in the primary 20 MHz channel as defined in Section 18.3.10.6 (CCA requirements) of the IEEE 802.11 specification |
| 40 MHz, 80 MHz, 160 MHz or 80 + 80 MHz | The start of a 40 MHz non-HT duplicate or VHT PPDU in the primary 40 MHz channel at or above −79 dBm, The start of an HT PPDU under the conditions defined in Section 20.3.21.5 (CCA sensitivity) of the IEEE 802.11 specification |
| 80 MHz, 160 MHz or 80 + 80 MHz | The start of an 80 MHz non-HT duplicate or VHT PPDU in the primary 80 MHz channel at or above −76 dBm |
| 60 MHz or 80 + 80 MHz | The start of a 160 MHz or 80 + 80 MHz non-HT duplicate or VHT PPDU at or above −73 dBm |

If the first status is IDLE, STA C follows the rules specified in the IEEE 802.11 specification and does not follow the remaining steps described here. If the first status is BUSY, STA. C follows the steps below.

If the first frame has a duration value (indicated, e.g., in the Duration field 652 of the MAC header in frame 650 of FIG. 6B) equal to zero, then STA C concludes that the first status is its final assessment of the medium, Upon receiving another frame from STA A or other STAs, STA C starts anew from Step (1).

If the first frame that STA C receives is a response frame (e.g., a CTS frame, an ACK or BA frame), then STA C concludes that the first status is its final assessment of the medium. Upon receiving another frame from STA A or other STAs, STA C starts anew from Step (1). Note that a response frame can be identified by the type and sub-type fields in the MAC header of the first frame. However, if the payload of the first frame is not decoded successfully, then STA C may alternatively conclude that the first frame is a response frame if the size of the first frame that is obtained from the L_LENGTH field in the L-SIG symbol (e.g., L-SIG field 603 of FIG. 6A) is equal to a predetermined value that is equivalent to the length of CTS, ACK, or BA (in its shortest form) frame as specified by the IEEE 802.11 specification.

STA C possibly records the RA field (e.g., 653 of FIG. 6B) and TA field (e.g., 654 of FIG. 6B) of the MAC layer frame header (e.g., 650) of the first frame to be used for subsequent assessment of the medium.

Step (2) After receiving a second frame (that is a response frame to the first frame) and measuring the associated RSSI of the second frame to be RSSIB (e.g., 808), STA C determines the status of the medium (denoted as the second status) based on the RSSI level of the first frame and the RSSI level of the second frame (i.e., RSSIA 807 and RSSIB 808). The second status of the medium may be equal to the first status (e.g., first status and second status both indicate IDLE or BUSY) or may be opposite of the first status (e.g., first status indicates BUSY and second status indicates IDLE). The rules to obtain the second status of the medium are described as follows:

If STA C does not receive the second frame (i.e., the response frame) after a SIFS interval (e.g., 412 of FIG. 4) or a PIFS interval (e.g., 416 of FIG. 4) from the end STA C uses the RSSI level measured for both of the frames (e.g., first frame, second frame) and checks whether some conditions on RSSIA (e.g., 807) and RSSIB 808) are met or not, after which the STA C can determine the second status of the medium.

STA C may check whether some conditions on RSSIA and RSSIB are met given the value of the Color field obtained from the PHY header of the first and second frames, after which STA C can determine the second status of the medium.

Note that a response frame can be identified by the type and sub-type fields in the MAC layer frame header (e.g., 650) of the first frame. However, if the payload of the second frame, that STA C receives, is not decoded successfully, then STA C may alternatively conclude that the second frame is actually a response frame if the size of the second frame that is obtained from the L_LENGTH field in the L-SIG symbol (e.g., 603) is equal to some predetermined values that are equivalent to the length of CTS (e.g., 854), ACK, or BA frame.

STA C possibly records the RA field (e.g., 653) and TA field (e.g., 654) of the MAC layer frame header (e.g., 650) of the second frame to be used for subsequent assessment of the medium. If the second frame is actually the response frame to the first frame, then the same values for the PA field (e.g., 653) and TA field (e.g., 654) appears in the second frame but the role of the RA and TA fields are switched (compared to the RA and TA fields in the first frame).

Step (3) To evaluate the second status of the medium:

STA C uses alternative RSSI thresholds as described below.

STA C may use one or more indicators obtained from the PHY header (e.g., HE SIG-A field 605, HE SIG-B field 606) of the first frame as described below.

STA C may use the TXOP/NAV values obtained from the MAC header of the first frame.

Step (4) STA C uses the second status of the medium as the final status of the medium when the below-mentioned conditions are met. Some possible outcomes after concluding the second status are:

STA C may change the status of the medium to IDLE.

STA C may reset the NAV value obtained from the first frame (e.g., 510 of FIG. 5), or STA C may avoid updating the NAV value based on the first frame (e.g., 510) or its response frame (e.g., 512).

STA C may change the stains of the medium to IDLE if during monitoring the subsequent frames it finds out that the frames are from STA A to STA B.

Step (5) The first frame and second frame (i.e., the frame and its response frame) may be an RTS frame (e.g., 852) and the CTS frame (e.g., 854) that is sent as a response to the RTS frame (see this case described below in details).

Step (6) The first and second frame (i.e., the frame and its response frame) may be a data frame (e.g., 872, 876 in FIG. 8C) and a ACK/BA frame (e.g., 874, 878 in FIG. 8C) that is sent as a response to the data frame (see this case described below in detail).

Step (7) The first frame may be a control frame that causes one or multiple STAs to respond with a frame that is considered an appropriate response to the first frame. An example of this case is a Trigger frame, which is used to poll several STAs to send a frame in response according to a multiuser (MU) format such as UL OFDMA or UL MU format.

Step (8) The first frame may be a DL MU frame that causes one or multiple STAs to respond with a multiplexed ACK/BA frame. An example of this case is a DL OFDMA frame, which causes all or some of the STAs identified in the DL OFDMA frame to send an ACK/BA frame.

The conditions that STA C checks to evaluate the second status of the medium are based on joint and individual values of RSSIA and RSSIB and are as follows. However, before using RSSIA and RSSIB in the following conditions, the values of RSSIA and RSSIB are normalized to the RSSI values for 20 MHz bandwidth. This means that if the first frame or the second frame are 40 MHz, then a −3 dB value may be added to the associated RSSI level. If the first frame or second frame are 80 MHz, then a −6 dB value is added to the associated RSSI level. If the first frame or the second frame are 160 MHz, then a −9 dB value is added to the associated RSSI level.

After the normalization, the following conditions are checked:
a) RSSI_HT1>RSSIA>RSSI_LT1
b) RSSI_HT2>RSSI_LT2
c) RSSIA-RSSIB>Delta In the above conditions, RSSI_HT1 and RSSI_HT2 are high threshold values on RSSI to ensure that STA A. (e.g. 801) and STA B (e.g., 802) are not too close to STA C (e.g., 803). In some embodiments, RSSI_LT1 and RSSI_LT2 are low threshold values on RSSI that check if STA A and STA B are too far from STA C (e.g. −90 dBm). In some other embodiments. RSSI_LT1 and RSSI_LT2 check whether the measured RSSI exceed the thresholds associated with establishing presence of an 802.11 frame (e.g. −82 dBm), or presence of an 802.11 frame from a BSS other than own BSS (i.e. OBSS preamble detect or OBSS_PD e.g. −72 dBm). All RSSI_HT1, RSS_HT2, RSSI_LT1 and RSSI_LT2 are values for the normalized case of 20 MHz bandwidth. Example values for RSSI_HT1 and RSSI_HT2 are −52 dBm or −62 dBm, and example values for RSSI_LT1 and RSSI_LT2 are −82 dBm or −79 dBm. The value of Delta depends on implementation and also depends on the TX power asymmetry (described below). In some embodiments. Delta may be set to 3 dB, while in some other embodiments it may be set to 6 dB, or 9 dBm. In some embodiments, the AP (e.g., 801) may indicate the value to be used for Delta in Beacon frames. If all three conditions above are met, then STA C sets the second status (as described above) to IDLE. Also, in the embodiments where the low thresholds are expected to check if STA C is far from STA A and STA B, if RSSIA<RSSI_LT1 and RSSIB<RBSI_LT2, then STA C sets the second status to IDLE. In some embodiments, if RSSIB<RSSI_LT2, then STA C sets the second status to IDLE. Note that in the following description, reference may be made to above by RSSI_HT and RSSI_LT (i.e., excluding designations 1 and 2).

In some embodiments, not all three conditions above need to be satisfied in order for the STA to set the channel status to IDLE, or in order to ignore updating the NAV, For instance, if RSSIA<RSSI_HT1 and RSSIA<RSSI_HT2, the STA may change the status of the medium to IDLE and/or may ignore updating the NAV based on the Duration field of the first frame (e.g., 510) or the response frame (e.g., 512). For instance, RSSI_HT1 may equal −62 dBm and RSSI_HT2 may equal −82 dBm. In another instance, RSSI_HT1 may equal −72 dBm and RSSI_HT2 may equal −72 dBm. Note that in legacy CCA systems, if the condition RSSIA>RSSI_HT1 is satisfied, where RSSI_HT1 may equal −82 dBm, then the status of the medium is set to BUSY (and the NAV is updated according to the specified rules in 802.11 specifications). Otherwise, the status of the medium is set to IDLE (and consequently no NAV updated is performed).

In some embodiments, whether all three conditions above or a subset of which are satisfied, the STA C sets the channel status to IDLE and/or ignores updating the NAV. In some embodiments, a STA may delay updating the NAV based on the Duration field content of the first frame until it receives a response frame after an IFS time interval following the first frame, after which the STA applies the principle described in the above embodiments to decide whether to update the NAV or ignore updating the NAV. For instance, the NAV is updated after some or all of the following conditions met: RSSIA>RSSI_HT1, RSSIB>RSSI_HT2, RSSIA-RSSIB>Delta). If some or all of the above-listed conditions are not met, for instance, the NAV can be ignored. In some embodiments, a STA may delay updating the NAV based on the Duration field of the first frame until it receives a response frame after an IFS time interval following the first frame, after which the STA applies the principle described in the above embodiments to decide whether to update the NAV or ignore updating the NAV. For instance, the NAV is updated after the following conditions are met: RSSIA>RSSI_HT1 and RSSIB>RSSI_HT2, otherwise the NAV update is ignored.

Figure 9A:
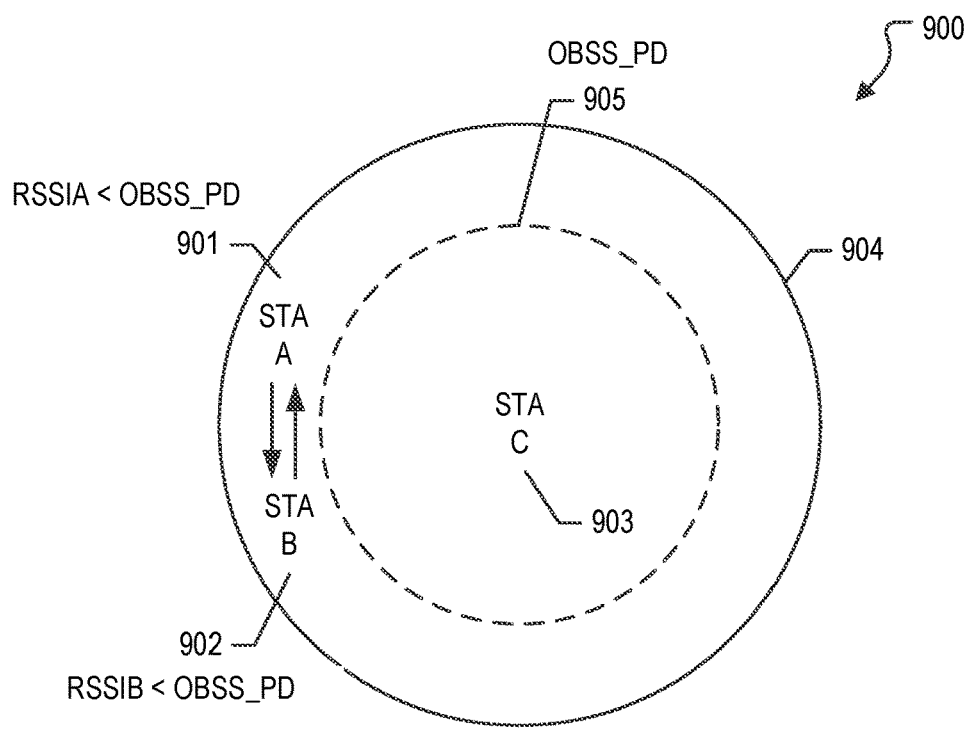
FIGS. 9A and 9B illustrate schematic diagrams of examples of overlapping basic service sets involving a CCA threshold rule.
Figure 9B:
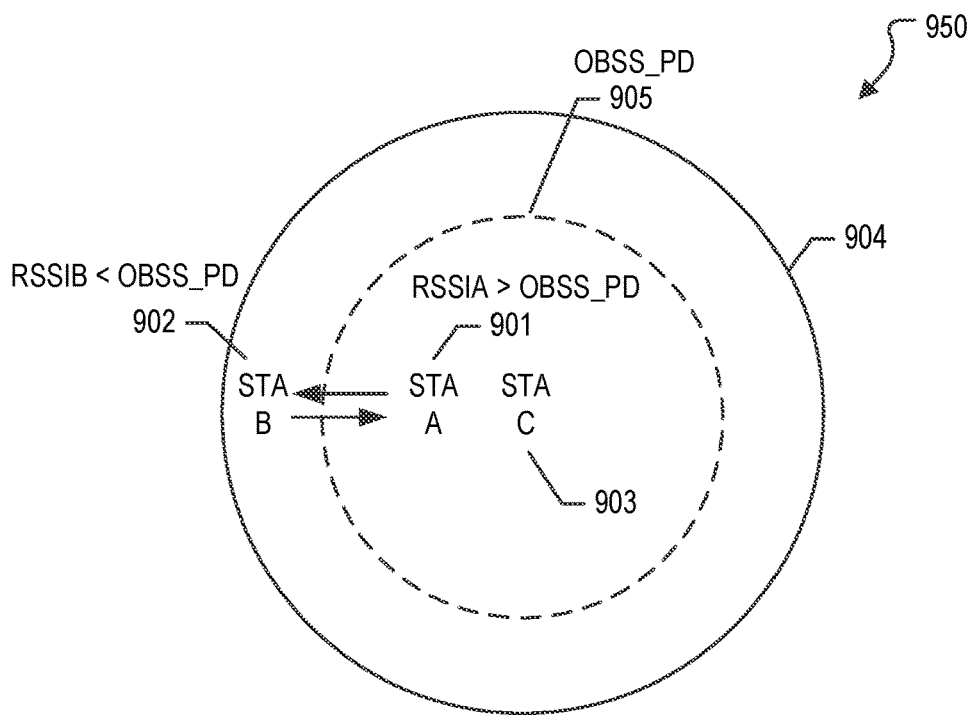

FIGS. 9A and 9B illustrate schematic diagrams of examples of overlapping basic service sets invoking a CCA threshold rule. FIG. 9A illustrates a schematic diagram 900 of an example of overlapping basic service sets where the stations are outside an OBSS threshold. The schematic diagram 900 includes the coverage region 904 beyond which the frames are received with RSSI less than −82 dBm. The schematic diagram 900 includes the coverage region 905 beyond which the frames are received with RSSI less than OBSS_PD. The region indicated by 904 includes a first station 901 (e.g., STA A), a second station 902 (e.g., STA B), where they both belong to the same BSS, and a third station 903 (e.g., STA C). Both coverage regions 904 and 905 are drawn with respect to STA C, which means e.g. STA C receives frames with RSSI more than −82 dBm if they originate from a STA within 904 (e.g. STA A and STA B), and STA C receives frames with RSSI more than OBSS_PD if they originate from a STA within 903. The first station 901 is transmitting a downlink frame to the second station 902, and the second station 902 sends a response frame to the first station 901. In this example, both stations (e.g., STA A. STA B) are inside coverage area associated with legacy CCA=−82 dBm (904), but outside the coverage area associated with CCA=OBSS_PD threshold (905). In FIG. 9A, the third station 903 (an unintended station with respect to the frame exchanged by STA A and STA B) performs the RSSI measurements of the first and second frames, where the associated RSSI of the downlink frame is RSSIA and the associated RSSI of the response frame is RSSIB. If RSSIA<OBSS_PD (e.g., 905) and RSSIB<OBSS_PD, then STA C is far enough from either station to exercise spatial reuse of the medium, with a minimum interference to the recipient of the frame sent by STA A 901. In some aspects, spatial reuse may be exercised if RSSIA<RSSI_HT1 and RSSIB<RSSI_HT3, where RSSI_HT3 is a third high threshold value to ensure that either STA A or STA B is not too close to STA C.

FIG. 9B illustrates a schematic diagram 950 of an example of overlapping basic service sets where the recipient station is outside the CCA threshold. In some embodiments, if RSSIA>RSSI_HT1, it may still be possible to exercise spatial reuse if the interference to the intended recipient of the frame is limited. In some aspects, even if RSSIA>RSSI_HT1 (e.g. OBSS_PD 905), as long as RSSIB<RSSI_HT3 (e.g. OBSS_PD or a higher threshold), then the recipient of the first frame (e.g., STA B 902) is far enough from the unintended STA (that has performed the RSSI measurements of the first and second frame, e.g., STA C 903). Hence, in the above-described situation it would be safe for the unintended STA (e.g., STA C) to perform spatial reuse and set the NAV back to the value before receiving the first frame and its response frame and/or assuming the medium is available to perform the backoff procedure and access the medium. In other words, a STA that receives an inter-BSS frame (i.e., a frame that does not belong to the same BSS as the BSS that the STA belongs to) with an associated RSSI that is greater than the RSSI_HT1 threshold (e.g., OBSS_PD 905) and receives the response frame with an associated RSSI that is less than the RSSI_HT3 threshold (e.g., OBSS_PD 905 or a higher threshold), the STA may set back the NAV to the value before receiving the inter-BSS frame. In another embodiment, a STA that receives an inter-BSS frame with an associated RSSI that is greater than the RSSI_HT1 threshold (e.g., OBSS_PD 905) and receives the response frame with an associated RSSI that is less than the RSSI_HT3 threshold (e.g., OBSS_PD 905), the STA may ignore receiving the first frame and its response frame (hence assuming the medium is IDLE), and/or the STA may set back the NAV to the value before receiving the inter-BSS frame. In some implementations, the RSSI_HT1 threshold may equal −62 dBm and the RSSI_HT3 threshold may equal −82 dBm. In other implementations, the RSSI_HT1 threshold may equal −72 dBm and the RSSI_HT3 threshold may equal −72 dBm:

In some embodiments, the above conditions may be considered along with the Color field value to decide whether the medium is IDLE or BUSY. In order to make the Color field more effective, these conditions are added:

a. When STA C receives a first frame that indicates the same Color value as one of the Color value that STA C is associated with, then legacy CCA thresholds are used for frames from the same BSS (i.e., the first status of the medium may be assessed as IDLE or BUSY based on the CCA thresholds given in the IEEE 802.11 specification). Upon receiving the second frame that is expected to be a response frame to the first frame, STA C may follow the same steps as described above. In some aspects, the response frame carries the same Color value as the Color value of the first frame. In other embodiments, STA C may conclude the first status as its final assessment for the status of the medium.

b. When STA C receives a first frame that indicates a different Color value as the Color value than the Color values that STA C is associated with, then STA C assesses the medium as IDLE or BUSY based on the CCA thresholds given in the IEEE 802.11 specification. If the assessed status of the medium (first status) is BUSY, then STA C records the first RSSI value, e.g., RSSIA, and waits for the second frame or the response frame. After receiving the response frame, STA C measures the RSSI value and denotes it as RSSIB. The STA C then determines the second status based on the RSSIA and the RSSIB as described above.

The following is an example according to the DCCA procedure described above where the first frame and the response frame are RTS and CTS frames, respectively:

a. STA A and STA B exchange RTS and CTS frames (see FIG. 8A, FIG. 8B)

b. STA C first receives the RTS frame (e.g., 852) and records the measured RSSI of the RTS frame: RSSIA (e.g., 807). Given that the measured RSSI for the RTS frame, RSSIA, is larger than a threshold that is specified in the IEEE 802.11 specification, then STA C concludes that the medium is BUSY. Otherwise, the medium is IDLE and the following steps related to DCCA are not performed. In an embodiment, if STA C finds out that the RTS frame is from the same BSS that the STA is associated with, then STA C would not perform the following steps. In an embodiment, if STA C finds out that the RTS frame carries a Color field that has the same value as one of the Color values that the STA is associated with, then STA C would not perform the following steps.

c. STA C then receives the CTS frame and records the measured RSSI of the CTS frame: RSSIB (e.g., 808)

d. STA C possibly records the TA/RA fields (e.g., 653, 654) of the MAC frame headers (e.g., 650) in the RTS and CTS frames. If the RA and TA addresses in the RTS frame suffice, and if the CTS frame is actually a response to the same RTS frame, then the TA address from the same RTS frame also appears in the CTS frame.

e. Note that it is possible that the STA C does not receive the CTS frame sent by STA B. This may be due to the fact that STA C is out of range of STA B. In the alternative, it may be that the RTS/CTS exchange may not have been successful, in which case STA A sends a CF-End frame afterward. Therefore if after a SIFS interval plus a duration (CTS) following the completion of the RTS frame, and if STA A sends a data frame, then it means that the RTS/CTS exchange was successful. In these sub-cases, where the CTS frame has not been received, STA C sets the value of RSSIB to a predetermined threshold, e.g., −90 dBm. The duration (CTS) indicates the duration of a CTS frame whose maximum value can be calculated as the duration of a CTS frame sent in legacy format with a low MCS such as MCS0.

f. If the conditions described above regarding RSSIA and RSSIB are met, then STA C changes the status of the medium to IDLE, Alternatively, STA C may ignore updating the NAV value based on the previous RTS frame. In another embodiment, STA C may monitor a subsequent frame, and if the subsequent frame is sent from STA A to STA B, then STA C can change the status of the medium to IDLE and initiate contending for the wireless medium.

The following is an example according to the DCCA procedure described above where the first frame and the response frame are a data frame and ACK/BA frame, respectively:

a. STA A and STA B exchange a data frame (e.g., 872, 876) and a ACK/BA frame (e.g., 874, 878)

b. STA C first receives the data frame (e.g., 872) and records the measured RSSI of the data frame: RSSIA (e.g., 807). Given that the measured RSSI for the data frame. RSSIA, is greater than a threshold that is specified in the IEEE 802.11 specification, then STA C concludes that the medium is BUSY. Otherwise, the medium is IDLE and the following steps related to DCCA are not performed. In an embodiment, if STA C finds out that the data frame is from the same BSS that the STA is associated with, then STA C would not perform the following steps. In an embodiment, if STA C finds out that the data frame carries a Color field that has the same value as one of the Color values that the STA is associated with, then STA C would not perform the following steps.

c. STA C then receives the ACK/BA frame (e.g., 874) and records the measured RSSI of the ACK/BA frame: RSSIB (e.g., 808).

d. STA C possibly records the TA/RA fields (e.g., 653, 654) of the MAC frame headers (e.g., 650) in the data and ACK/BA frames. If the RA and TA addresses in the data frame suffice, and if the ACK/BA frame is a response to the same data frame, then the RA/TA address from the data frame also appear in the ACK/BA frame, but their role as RA vs TA may be switched.

e. Note that it may possible that STA C does not receive the ACK/BA frame sent by STA B. This may be due to the fact that STA C is out of range of STA B. Alternatively, it may be that STA B has not successfully decoded the data frame Therefore, if after a SIFS interval (or a PIFS interval) following completion of the data frame the STA A sends a new data frame, then this procedure starts anew and STA C considers this frame as the data frame and associates the new measured RSSI value to RSSIA. After this, STA C looks for a response frame from STA B, and after receiving the response frame, STA C sets the value of RSSIB.

f. If the conditions described above regarding RSSIA and RSSIB are met, then STA C changes the status of the medium to IDLE. Alternatively, STA C may ignore updating the NAV based the previous data frame. In another embodiment, STA C may monitor a subsequent frame, and if the subsequent frame is sent from STA A to STA B, then STA C can change status of the medium to IDLE and initiate contending for the wireless medium.

The following is an example of the DCCA procedure described above where the first frame is a Trigger frame and the response frame are either data frames or control frames that are sent simultaneously by a set of STAs that are identified by the Trigger frame:

a. STA A sends a Trigger frame to a set of STAs, e.g., STA B1. STA B2, ... (e.g., 702, 703), where the set of STAs are expected to respond with data or control frames within an IFS interval after the end of the Trigger frame.

b. STA C (that is not among the set of STAs identified in the Trigger frame) first receives the Trigger frame and records the measured RSSI of the Trigger frame: RSSIA (e.g., 807). Given that the measured RSSI for the Trigger frame. RSSIA, is greater than a threshold that is specified in the IEEE 802.11 specification, then STA C concludes that the medium is BUSY. Otherwise, the medium is IDLE and the following steps are not performed. In an embodiment, if STA C finds out that the Trigger frame is from the same BSS that the STA is associated with, then STA C would not perform the following steps. In an embodiment, if STA C finds out that the Trigger frame carries a Color field that has the same value as one of the Color values that the STA is associated with, then STA C would not perform the following steps.

c. STA C receives a response frame (which is an RE-combined version of all the response frames that STA B1, STA B2, ... have sent) and records the measured RSSI of the response frame: RSSIB.

d. Note that it is possible that STA C does not receive the second frame (e.g., ACK frame) after an IFS interval. This may be due to the fact that STA C is out of range of STA B1, STA B2 ..., or the reason may be that none of the STAs successfully decoded the Trigger frame. Therefore, if after an IFS interval following the completion of Trigger frame the STA A sends a new frame, then this procedure starts anew and STA C considers this frame as the data frame and associates the new measured RSSI value to RSSIA.

e. If the conditions described above regarding RSSIA, and RSSIB are met, then STA C changes the status of the medium to IDLE. Alternatively, STA C may reset the NAV value obtained from the previous data frame.

In some embodiments, the PHY header of an HE PPDU (whether SU PPDU or MU PPDU) may carry an indicator in HE SIG-A or HE SIG-B, which indicates whether the sender of the frame allows DCCA, The indicator is set to a TRUE value (i.e., disallowing DCCA to be performed) based on specific implementations. The following are embodiments where the indicator may be set in all or some of the cases: (a) If the sender of the frame (e.g., STA A) expects that the ACK/BA is going to be sent with a high MCS (by the recipient of the frame, e.g., STA B), (b) If the sender of the frame (e.g., STA A) sends a single frame and expects one response frame or no response frame from the recipient (e.g., STA B), (c) If the sender of the frame (e.g., STA A) sends a MU frame, or (d) if the sender of the frame sends a Trigger frame or any frame that polls a response from multiple STAs in a multiplexed fashion (such as UL OFDMA or UL MU MIMO, or multiplexing methods based on orthogonal codes).

Regarding all of the above embodiments, it is possible to use a transmit power control (TPC) technique. In some conventional CCA techniques, a STA may conclude the medium is IDLE after receiving the first frame that has a Color field with a different value than the Color values that the STA is associated with. However, if the STA decides (after contending the medium and winning the contention) to send a frame, the STA shall use a reduced power (TXPWR) compared to a reference TXPWR, where the amount of power reduction is calculated based on the difference of the RSSI of the first frame (e.g., RSSIA) and the RSSI_TH values. For instance, if RSSI_TH equals −82 dBm and the RSSI of the received frame (e.g., RSSIA) is −72 dBm, the STA may reduce its power by 1.0 dB and sends its frame with the reduced transmit power. In one embodiment, the STA that uses the above technique to access the medium may also receive a response frame (either to the first frame or later it receives a frame that is identified as a frame that is sent from the recipient of the first frame to the sender of the first frame), and if the conditions relating to RSSIA and RSSIB (measured RSSI of the first and second frames) meet any of the previously mentioned conditions, then the STA may partially or fully adjust back the transmit power to the original setting (e.g., to ignore the reduction of the transmit power that was originally applied based on the RSSI level of the first frame).

The PHY header of an HE PPDU (whether SU PDU or MU PPDU) may carry an indicator in the HE SIG-A or HE SIG-B fields, which indicates whether the modified (aggressive or less sensitive) CCA rules based on the Color field may be allowed or not. Such indication may only be present in DL frames, i.e., frames sent by the AR The STAs that are associated with the AP, which has set this indicator to a TRUE value, would not use aggressive or higher value thresholds for the frames that do not have the same Color field as theirs.

In one or more embodiments, the transmit (TX) power of various STAs may be different. For instance, the transmit power of an AP may be 20 dBm and the transmit power of a STA may be 17 dBm. The transmit power asymmetry requires some correction to the RSSI levels (e.g., RSSIA and RSSIB mentioned above). One example is to add an offset (e.g., delta2) to the condition listed above, e.g., Delta+delta2, where delta2 may be equal to 3 dB. Another example is to carry some quantized transmit power with the PHY header (e.g., HE SIG-A) of every frame. Such power indicator may be present in HE SIG-A or SIG-B of a DL SU PPDU or in a DL MU PPDU. The power indicator would be represented by a few bits, e.g., 3 bits, where each value indicates a range of transmit powers. If such power indication is present in the first frame and the second frame, then STA C evaluates the difference in the TX power indicator of the first frame and the response frame, and then calculates a new Delta value and uses the new Delta value in the conditions described above (e.g., RSSI_HT1>RSSIA>RSSI_LT1; RSSI_HT2>RSSIB>RSSI_LT2; RSSIA−RSSIB>Delta).

In some embodiments, some RSSI measurements may be fed back from one STA once its peer STA requests the measurement. Consider the above example where STA A sends a first frame to STA B and STA B sends a second frame to STA A, and the frame exchange may continue for the TXOP duration that the STA A has initiated. STA C receives the first frame and the response frame exchanged by STA A and STA B, and records RSSIA and RSSIB and TA/RA fields from the MAC header of the frame and the response frame. STA C intends to exchange frames with STA D (e.g., 804). STA C requests STA D to report the RSSI levels that STA D has measured from STA A and STA B (particularly the RSSI measurements from the first frame exchange described above, i.e., the first frame and the second frame). STA D reports back the measured RSSI values (denoted as RSSIa and RSSIb). Then STA C checks the values of RSSIA, RSSIB, RSSIa and RSSIb, and decides to initiate a TXOP with STA D or decides that the status of the medium is BUSY.

Figure 10A:
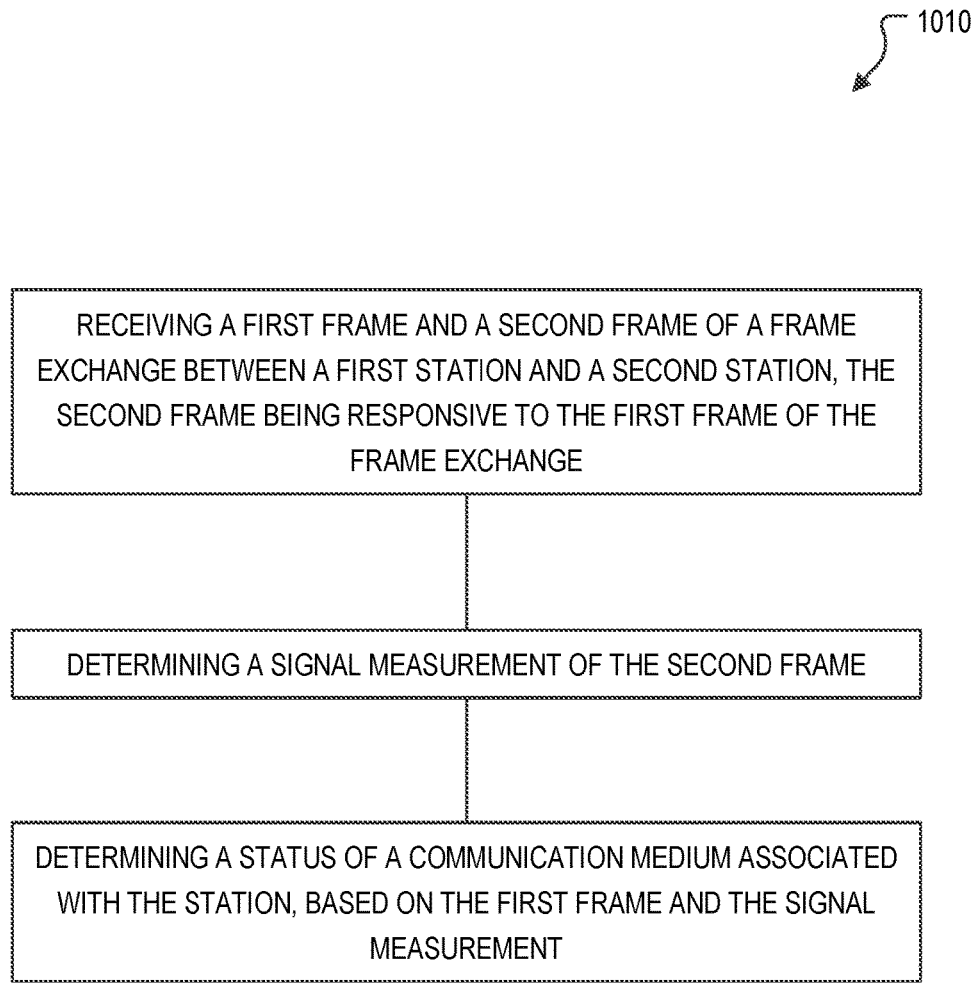
FIGS. 10A through 10C illustrate flow charts of examples of enhanced CCA procedures.
Figure 10B:
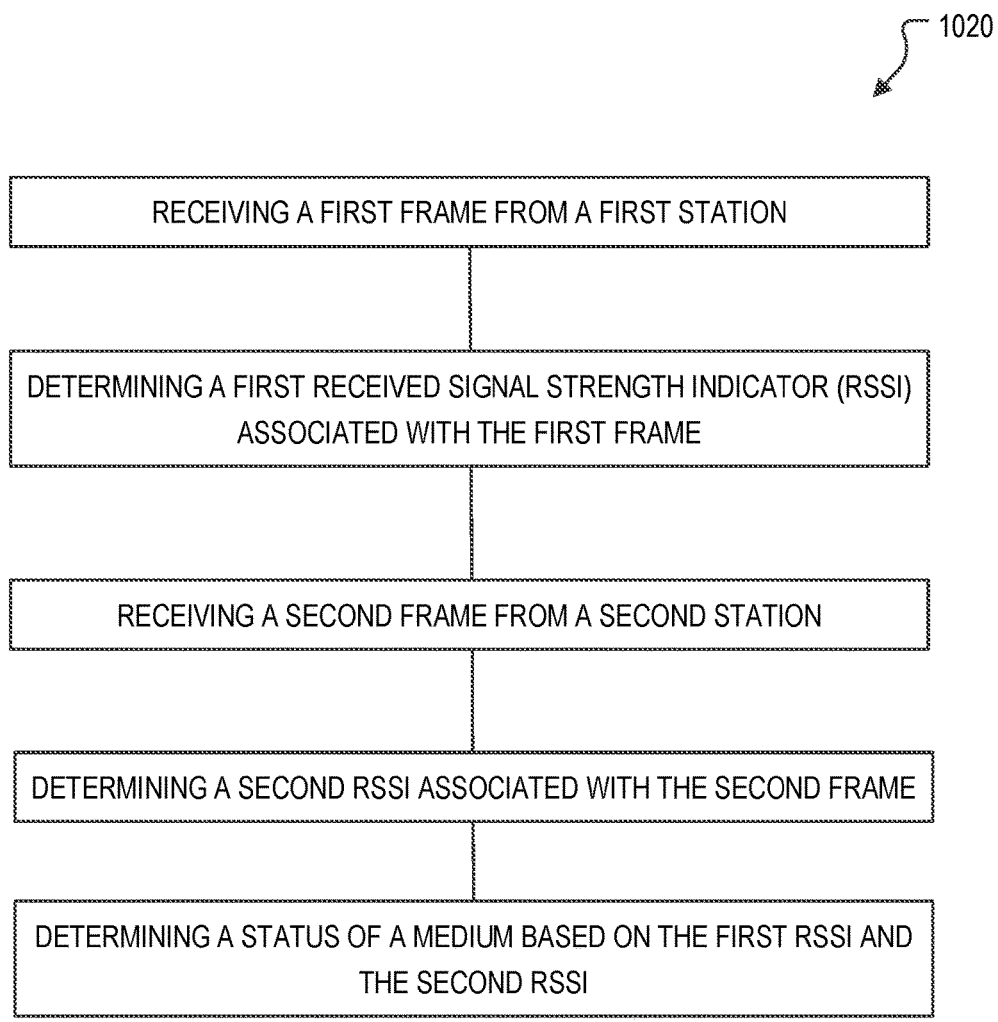
Figure 10C:
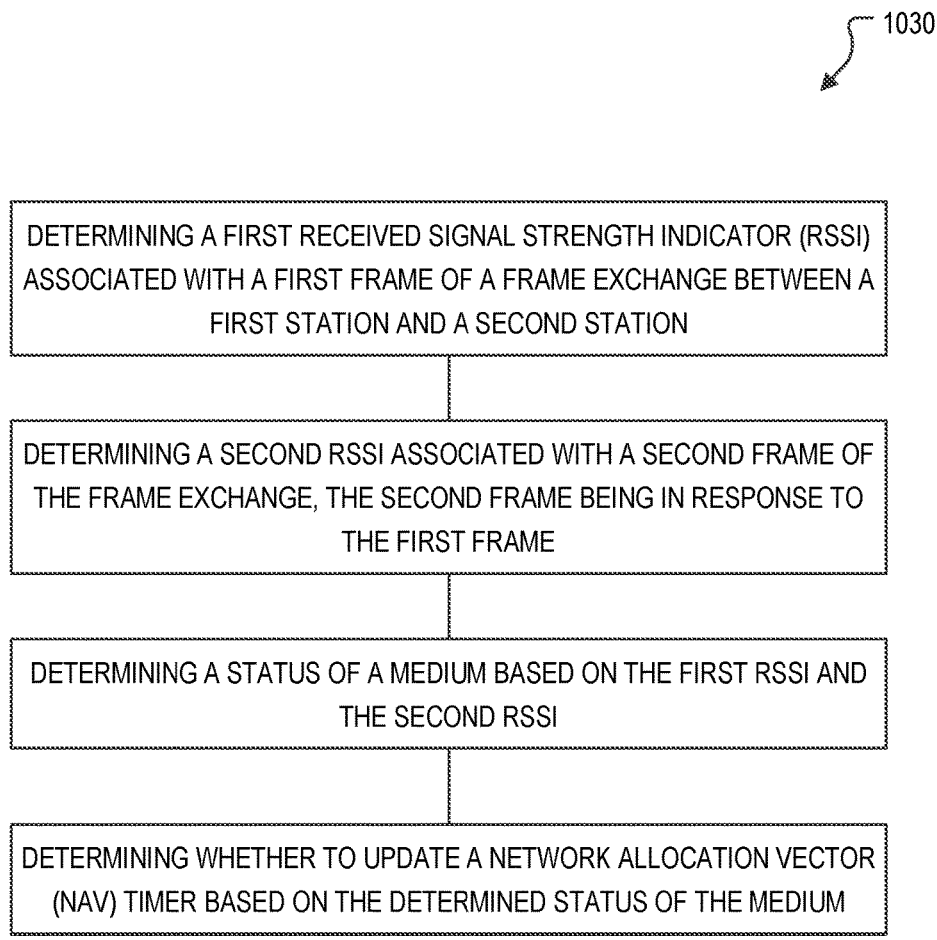

FIGS. 10A-10C illustrate flow charts of examples of enhanced CCA methods. For explanatory and illustration purposes, the example processes 1010, 1020 and 1030 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1010, 1020 and 1030 are not limited to the wireless communication devices 111-115 of FIG. 1 or their components, and the example processes 1010, 1020 and 1030 may be performed by some of the devices shown in FIG. 1, or other devices or components. Further for explanatory and illustration purposes, the blocks of the example processes 1010, 1020 and 1030 are described herein as occurring in serial or linearly. However, multiple blocks of the example processes 1010, 1020 and 1030 may occur in parallel. In addition, the blocks of the example processes 1010, 1020 and 1030 need not be performed in the order shown and/or one or more of the blocks/actions of the example processes 1010, 1020 and 1030 need not be performed. Various examples of aspects of the disclosure are described below as clauses for convenience. These are provided as examples, and do not limit the subject technology. As an example, some of the clauses described below are illustrated in FIGS. 10A through 10C.

Clause A. A station for facilitating multi-user communication in a wireless network, the station comprising: one or more memories; and one or more processors coupled to the one or more memories, the one or more processors configured to cause: receiving a first frame and a second frame of a frame exchange between a first station and a second station, the second frame being responsive to the first frame of the frame exchange; determining a signal measurement of the second frame; and determining a status of a communication medium associated with the station, based on the first frame and the signal measurement.

Clause B. A non-transitory computer-readable storage medium storing computer-executable instructions that, when executed by one or more processors, cause one or more processors to perform operations, the operations comprising: receiving a first frame from a first station; determining a first received signal strength indicator (RSSI) associated with the first frame; receiving a second frame from a second station; determining a second RSSI associated with the second frame; and determining a status of a medium based on the first RSSI and the second RSSI.

Clause C. A computer-implemented method of facilitating multi-user communication in a wireless network, the method comprising: determining a first received signal strength indicator (RSSI) associated with a first frame of a frame exchange between a first station and a second station; determining a second RSSI associated with a second frame of the frame exchange, the second frame being in response to the first frame; determining a status of a medium based on the first RSSI and the second RSSI; and determining whether to update a network allocation vector (NAV) timer based on the determined status of the medium.

In one or more aspects, additional clauses are described below.

A method comprising one or more methods or operations described herein.

An apparatus comprising one or more memories (e.g., 240, one or more interim, external or remote memories, or one or more registers) and one or more processors (e.g., 210) coupled to the one or more memories, the one or more processors configured to cause the apparatus to perform one or more methods or operations described herein.

An apparatus comprising means e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

Figure 11:
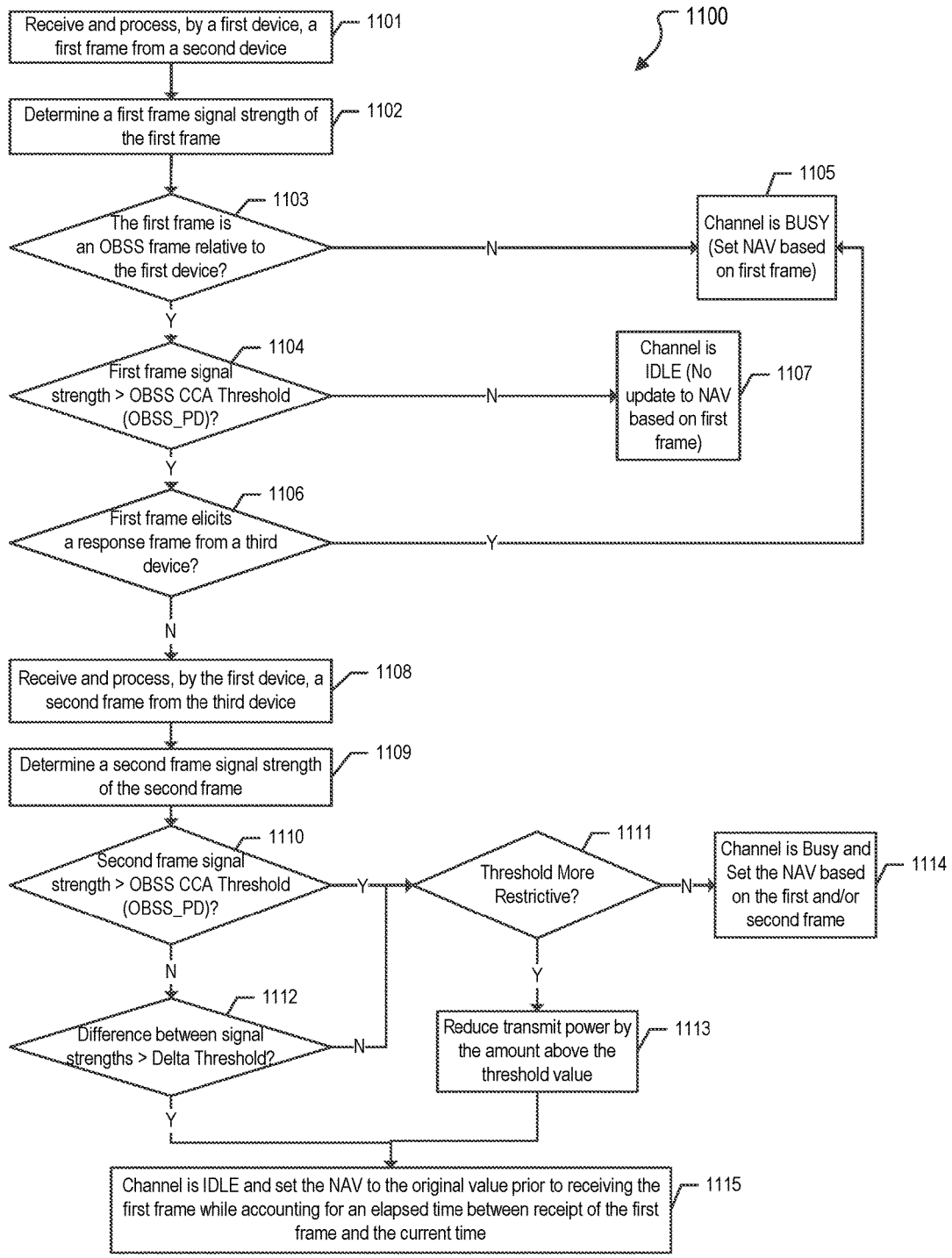
FIG. 11 illustrates a flow chart of an example of a process for enhanced CCA methods.

FIG. 11 illustrates a flow chart of an example of a process 1100 for enhanced CCA methods. For explanatory and illustration purposes, the example process 1100 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example process 1100 is not limited to the wireless communication devices 111-115 of FIG. 1 or their components, and the example process 1100 may be performed by some of the devices shown in FIG. 1, or other devices or components. Further for explanatory and illustration purposes, the blocks of the example process 1100 is described herein as occurring in serial or linearly. However, multiple blocks of the example process 1100 may occur in parallel. In addition, the blocks of the example process 1100 need not be performed in the order shown and/or one or more of the blocks/actions of the example process 1100 need not be performed. Various examples of aspects of the disclosure are described below as steps for convenience. These are provided as examples, and do not limit the subject technology. As an example, some of the steps described below are illustrated in FIG. 11.

In step 1101, a first device (e.g., wireless communication devices 111-115) receives and processes a first frame from a second device (e.g., wireless communication devices 111-115). The first frame may be part of a frame exchange between the second device and a third device (e.g., wireless communication devices 111-115). In step 1102, the first device determines a first frame signal measurement of the first frame.

In step 1103, the first device determines, in response to determining the first frame signal measurement, whether the first frame is an OBSS frame relative to the first device. If the first frame is an OBSS relative to the first frame, then the process 1100 proceeds to step 1104. Otherwise, the process 1100 proceeds to step 1105.

In step 1104, the first device, in response to determining that the first frame is an OBSS relative to the first device, determines whether the first frame signal measurement exceeds a predetermined OBSS threshold (e.g., OBSS_PD). If the first frame signal measurement exceeds the predetermined OBSS threshold, then the process 1100 proceeds to step 1106. Otherwise, the process 1100 proceeds to step 1107.

In step 1105, the channel is determined busy when the first frame is determined not to be an OBSS frame relative to the first device and the first device sets the NAV timer value based on the first frame.

In step 1106, the first device determines, in response to determining that the first frame signal measurement exceeds the OBSS threshold, whether the first frame elicits a response frame from the third device. If the first frame elicits a response frame, then the process 1100 proceeds back to step 1005. Otherwise, the process 1100 proceeds to step 1108.

In step 1107, the channel is determined idle when the first frame signal measurement is determined not to exceed the predetermined OBSS threshold and the first device does not update the NAV timer value based on the first frame.

In step 1108, the first device receives and processes a second frame from the third device. In some aspects, the first device determines whether the second frame is an OBSS frame relative to the first device. In step 1109, the first device then determines a second frame signal measurement of the second frame. In some aspects, the second frame signal measurement is determined in response to determining that time second frame is an OBSS frame relative to the first device.

In step 1110, the first device determines whether the second frame signal measurement exceeds the predetermined OBSS threshold (e.g., OBSS_PD). In some aspects, the predetermined OBSS threshold compared against the second frame may be different (or more restrictive) than the predetermined OBSS threshold compared against the first frame. If the second frame signal measurement exceeds the predetermined OBSS threshold, then the process 1100 proceeds to step 1111. Otherwise, the process 1100 proceeds to step 1112.

In step 1111, the first device determines whether the predetermined OBSS threshold compared against the second frame is more restrictive than the predetermined OBSS threshold compared against the first frame. If the second threshold is more restrictive, then the process 1100 proceeds to step 1113 so that the first device can reduce its transmit power by the amount above the threshold value(s). Otherwise, the process 1100 proceeds to step 1114.

In some aspects, the difference between the two signal strengths ($1^{st}$ Strength-$2^{nd}$ Strength) may be compared against a predetermined delta threshold. In step 1112, the first device determines whether the difference between signal strengths exceeds the predetermined delta threshold. If the difference in signal strengths exceed the predetermined delta threshold, then the process 1100 proceeds to step 1115. Otherwise, the process 1100 proceeds back to step 1111.

In step 1113, the first device reduces the transmit power of the first device by the amount above the threshold value.

In step 1114, the channel is determined busy and the first device sets the NAV timer value based on the first frame and/or the second frame.

In step 1115, the channel is determined idle and the first device sets the NAV timer value to the original value prior to receiving the first frame while accounting for an elapsed time between receipt of the first frame and the current time. In some aspects, the first device may either ignore setting the NAV timer value based on the first frame or the first device may update the NAV timer value before receipt of the first frame minus the elapsed time.

The embodiments provided herein have been described with reference to a wireless LAN system; however, it may be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, andlor one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiting or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C, any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It may be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject mailer.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor may they be interpreted in such a way.

What is claimed is:

1. A wireless device for facilitating spatial reuse in a first wireless network, the wireless device comprising:
one or more memories; and
one or more processors coupled to the one or more memories, the one or more processors configured to:
process a first frame and a second frame of a frame exchange between a first station and a second station, the second frame being responsive to the first frame of the frame exchange;
determine that the first frame or the second frame is associated with a second wireless network;
determine, in response to determining that the first frame or the second frame is associated with the second wireless network, a second frame signal measurement of the second frame; and
determine a status of a communication medium associated with the wireless device, based on a comparison of a first frame signal measurement of the first frame and the second frame signal measurement to an overlapping basic service set (OBSS) threshold.

2. The wireless device of claim 1, wherein the one or more processors are further configured to:
determine whether the first frame signal measurement exceeds the OBSS threshold;
determine, in response to determining that the first frame signal measurement exceeds the OBSS threshold, whether the second frame signal measurement exceeds the OBSS threshold based on a comparison of the second frame signal measurement to the OBSS threshold;
determine that the status of the communication medium is idle when the second frame signal measurement does not exceed the OBSS threshold; and
determine that the status of the communication medium is busy when the second frame signal measurement exceeds the OBSS threshold.

3. The wireless device of claim 2, wherein the one or more processors are further configured to:
update a network allocation vector (NAV) timer when the status of the communication medium is determined busy; and
ignore updating the NAV timer based on the first frame and the second frame when the status of the communication medium is determined idle.

4. The wireless device of claim 2, wherein the one or more processors are further configured to:
update a network allocation vector (NAV) timer when the status of the communication medium is determined busy; and
reset the NAV timer to a value immediately before receipt of the first frame minus an elapsed time between receipt of the first frame and determine the status of the communication medium based on the first frame and the second frame when the status of the communication medium is determined idle.

5. The wireless device of claim 1, wherein the first frame is a request-to-send (RTS) frame and the second frame is a clear-to-send (CTS) frame for protecting a channel in the first wireless network.

6. The wireless device of claim 2, wherein the one or more processors are further configured to:
determine a difference between the first frame signal measurement and the second frame signal measurement;
determine whether the determined difference exceeds a predetermined delta value based on a comparison of the determined difference to the predetermined delta value;
determine that the status of the communication medium is idle when the second frame signal measurement does not exceed the OBSS threshold and the determined difference exceeds the predetermined delta value; and
determine that the status of the communication medium is busy when the second frame signal measurement exceeds the OBSS threshold or the determined difference does not exceed the predetermined delta value.

7. The wireless device of claim 6, wherein the difference between the first frame signal measurement and the second frame signal measurement is determined based on a transmission power difference between the first station and the second station, wherein the first station transmits at a first power level, as indicated in the first frame, and the second station transmits at a second power level, as indicated in the second frame.

8. The wireless device of claim 7, wherein the one or more processors are further configured to:
reduce the predetermined delta value based on an amount the wireless device is capable of reducing a transmit power of the wireless device.

9. The wireless device of claim 2, wherein the one or more processors are further configured to:
reduce, in response to determining that the second frame signal measurement exceeds the OBSS threshold, a transmit power of the wireless device based on a difference between the OBSS threshold and the first frame signal strength and determine that the status of the communication medium is idle.

10. The wireless device of claim 2, wherein the first frame signal measurement comprises a received signal strength indicator (RSSI) value associated with the first frame, and the second frame signal measurement comprises a RSSI value associated with the second frame.

11. The wireless device of claim 1, wherein:
the wireless device is configured to determine that the first frame is associated with the second wireless network based on a COLOR field in a High-Efficiency Signal-A (HE-SIG-A) field of the first frame or based on a match between either a transmit address or a receive address in a media access control (MAC) header of the first frame and at least a set of most significant bits of a basic service set identifier (BSSID) of the second wireless network, and
the wireless device is configured to determine that the second frame is associated with the second wireless network based on a COLOR field in a HE-SIG-A field of the second frame or based on a match between either a transmit address or a receive address in a MAC header of the second frame and at least a set of most significant bits of the BSSID of the second wireless network.

12. A computer-implemented method of facilitating spatial reuse in a first wireless network, the method comprising:
processing a first frame and a second frame of a frame exchange between a first station and a second station, the second frame being responsive to the first frame of the frame exchange;
determining that the first frame or the second frame is associated with a second wireless network;
determining, in response to determining that the first frame or the second frame is associated with the second wireless network, a first frame signal measurement of the first frame and a second frame signal measurement of the second frame; and determining a status of a communication medium associated with a wireless device, based on a comparison of a first frame signal measurement of the first frame signal measurement and the second frame signal measurement to an overlapping basic service set (OBSS) threshold.

13. The computer-implemented method of claim 12, wherein the first frame signal measurement comprises a received signal strength indicator (RSSI) value associated with the first frame, and the second frame signal measurement comprises a RSSI value associated with the second frame.

14. The computer-implemented method of claim 13, further comprising:

updating a network allocation vector (NAV) timer when the status of the communication medium is determined busy; and ignoring updating the NAV timer based on the first frame and the second frame when the status of the communication medium is determined idle.

15. The computer-implemented method of claim 13, further comprising:

updating a network allocation vector (NAV) timer when the status of the communication medium is determined busy; and resetting the NAV timer to a value immediately before receipt of the first frame minus an elapsed time between receipt of the first frame and determining the status of the communication medium based on the first frame and the second frame when the status of the communication medium is determined idle.

16. The computer-implemented method of claim 13, further comprising:

determining whether the first frame signal measurement exceeds the OBSS threshold;

determining, in response to determining that the first frame signal measurement exceeds the OBSS threshold, whether the second frame signal measurement exceeds the OBSS threshold based on a comparison of the second frame signal measurement to the OBSS threshold;

determining that the status of the communication medium is idle when the second frame signal measurement does not exceed the OBSS threshold; and determining that the status of the communication medium is busy when the second frame signal measurement exceeds the OBSS threshold.

17. The computer-implemented method of claim 16, further comprising:

determining a difference between the first frame signal measurement and the second frame signal measurement;

determining whether the determined difference exceeds a predetermined delta value based on a comparison of the determined difference to the predetermined delta value;

determining that the status of the communication medium is idle when the second frame signal measurement does not exceed the OBSS threshold and the determined difference exceeds the predetermined delta value; and determining that the status of the communication medium is busy when the second frame signal measurement exceeds the OBSS threshold or the determined difference does not exceed the predetermined delta value.

18. The computer-implemented method of claim 17, wherein the difference between the first frame signal measurement and the second frame signal measurement is determined based on a transmission power difference between the first station and the second station, wherein the first station transmits at a first power level, as indicated in the first frame, and the second station transmits at a second power level, as indicated in the second frame.

19. The computer-implemented method of claim 12, wherein:

the wireless device determines that the first frame is associated with the second wireless network based on a COLOR field in a High-Efficiency Signal-A (HE-SIG-A) field of the first frame or based on a match between either a transmit address or a receive address in a media access control (MAC) header of the first frame and at least a set of most significant bits of a basic service set identifier (BSSID) of the second wireless network, and the wireless device determines that the second frame is associated with the second wireless network based on a COLOR field in a HE-SIG-A field of the second frame or based on a match between either a transmit address or a receive address in a MAC header of the second frame and at least a set of most significant bits of the BSSID of the second wireless network.

* * * * *